(12) United States Patent
Sestok, IV

(10) Patent No.: US 10,778,498 B2
(45) Date of Patent: *Sep. 15, 2020

(54) TX IQ MISMATCH PRE-COMPENSATION

(71) Applicant: TEXAS INSTRUMENTS INCORPORATED, Dallas, TX (US)

(72) Inventor: Charles K. Sestok, IV, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 17 days.

This patent is subject to a terminal disclaimer.

(21) Appl. No.: 16/141,592

(22) Filed: Sep. 25, 2018

(65) Prior Publication Data

US 2019/0097866 A1 Mar. 28, 2019

Related U.S. Application Data

(63) Continuation of application No. 14/834,405, filed on Aug. 24, 2015, now Pat. No. 10,097,396.

(Continued)

(51) Int. Cl.
*H04L 27/36* (2006.01)
*H04L 27/38* (2006.01)
*H04L 5/00* (2006.01)

(52) U.S. Cl.
CPC .......... *H04L 27/364* (2013.01); *H04L 5/0044* (2013.01); *H04L 27/366* (2013.01); *H04L 27/3863* (2013.01)

(58) Field of Classification Search
CPC ............... H04L 27/364; H04L 27/3863; H04L 27/0014; H04L 27/34; H04L 2027/0067;
(Continued)

(56) References Cited

U.S. PATENT DOCUMENTS 5,381,108 A 1/1995 Whitmarsh et al.
5,691,472 A 11/1997 Petri
(Continued)

*Primary Examiner* — David C Payne
*Assistant Examiner* — Sarah Hassan
(74) *Attorney, Agent, or Firm* — John R. Pessetto; Charles A. Brill; Frank D. Cimino

(57) ABSTRACT

A direct conversion wireless transmitter includes IQ mismatch pre-compensation using direct learning adaptation to adjust IQ pre-compensation filtering. Widely-linear IQ_mismatch pre-compensation filtering compensates for IQ mismatch in the TX analog chain, filtering of input data x(n) to provide pre-compensated data y(n) with a compensation image designed to interfere destructively with the IQ_mismatch image. A feedback receiver FBRX captures feedback data z(n) used for direct learning adaptation. DL adaptation adjusts IQ_mismatch filters, modeled as an x(n)_direct and complex conjugate x(n)_image transfer functions w1 and w2, including generating an adaptation error signal based on a difference between TX/FBRX-path delayed versions of x(n) and z(n), and can include estimation and compensation for TX/FBRX phase errors. DL adaptation adjusts the IQ pre-comp filters w1/w2 to minimize the adaptation error signal. Similar modeling can be used for IQ mismatch. The IQ_mismatch pre-compensator can be implemented as a combination of digital signal processing and hardware acceleration.

11 Claims, 3 Drawing Sheets

Related U.S. Application Data

(60) Provisional application No. 62/040,775, filed on Aug. 22, 2014.

(58) Field of Classification Search
CPC . H04L 27/366; H04L 27/3809; H04L 5/0044; H04L 1/0042; H04L 27/3405
USPC .......................................... 375/296; 341/57
See application file for complete search history.

(56) References Cited

U.S. PATENT DOCUMENTS

| | | | |
|---|---|---|---|
| 5,717,140 A | 2/1998 | Hulsing, II | |
| 6,670,900 B1 | 12/2003 | Zhang | |
| 7,382,297 B1 | 6/2008 | Kopikare et al. | |
| 8,023,589 B2* | 9/2011 | Onggosanusi | H04B 7/0417 370/208 |
| 2002/0160741 A1 | 10/2002 | Kim et al. | |
| 2003/0021351 A1* | 1/2003 | Talwar | H04B 7/0615 375/267 |
| 2003/0139167 A1 | 7/2003 | Ciccarelli et al. | |
| 2004/0002323 A1 | 1/2004 | Zheng et al. | |
| 2004/0184562 A1 | 9/2004 | Wang et al. | |
| 2005/0014475 A1 | 1/2005 | Kim | |
| 2005/0041754 A1 | 2/2005 | Wu et al. | |
| 2006/0056546 A1 | 3/2006 | Hayase et al. | |
| 2006/0081191 A1 | 4/2006 | Keasy et al. | |
| 2007/0104291 A1 | 5/2007 | Yoon | |
| 2010/0302083 A1 | 12/2010 | Helfenstein et al. | |

* cited by examiner

TX IQ MISMATCH PRE-COMPENSATION

CROSS-REFERENCE TO RELATED APPLICATIONS

This application is a continuation of U.S. application Ser. No. 14/834,405, filed 2015 Aug. 24, which claims priority under 37 CFR 1.78 and 35 USC 119(e) to U.S. Provisional Application 62/040,775, filed 2014 Aug. 22, which are incorporated in their entirety by reference.

BACKGROUND

Technical Field

This Patent Document relates generally to direct-conversion wireless transmitter design, including IQ mismatch compensation.

Related Art

In wireless transceivers, direct conversion can be used for the transmitter (TX) and/or receiver (RX). Direct conversion (zero/low IF) wireless architectures use IQ modulation/demodulation and direct upconversion/downconversion to/from RF, eliminating conversion at an intermediate frequency (IF).

Direct conversion architectures commonly use quadrature (IQ) signal conversion and digital filtering. To meet requirements on out-of-band emissions, direct conversion transmitter designs commonly use digital compensation for TX non-linearities and IQ mismatch (mismatch/imbalance between I and Q signal paths).

TX non-linearities can be compensated by digital pre-distortion (DPD). IQ mismatch is compensated by digital filtering (IQ mismatch compensation or QMC). A feedback receiver (FBRX) is used to capture data required for such compensation.

IQ mismatch generates an image at frequencies reflected about the LO (local oscillator) frequency, which can appear in frequency bands outside the channel reserved for the TX (direct) signal. QMC is used to meet spectral emissions mask requirements for out-of-band interference, such as ACLR (adjacent channel leakage ratio) and ACPR (adjacent channel power ratio).

Various approaches to adapting TX QMC filter coefficients either make assumptions about the IQ mismatch, or restrict the form of the transmitted signal band. For example, TX QMC filter coefficients can be adapted assuming the TX IQ mismatch is frequency-independent, or that it does not drift with temperature. The frequency-independent assumption is not satisfied for transmitters that need to handle broadband signals, such as multi-carrier LTE deployments. Solutions that assume the mismatch does not drift (for example, due to ambient temperature control) can use a one-time calibration with a broadband training signal during system power up.

Other approaches are able to adapt the TX IQ mismatch over a wide bandwidth, and track temperature variations as long as the signal spectrum is restricted to a symmetric band. These approaches require a single carrier or regularly spaced channels.

BRIEF SUMMARY

This Brief Summary is provided as a general introduction to the Disclosure provided by the Detailed Description and Drawings, summarizing aspects and features of the Disclosure. It is not a complete overview of the Disclosure, and should not be interpreted as identifying key elements or features of, or otherwise characterizing or delimiting the scope of, the disclosed invention.

The Disclosure describes apparatus and methods for TX IQ mismatch pre-compensation using direct learning adaptation, suitable for use in a direct conversion wireless transmitter architecture.

According to aspects of the Disclosure, a direct conversion wireless transmitter can include IQ mismatch pre-compensation using direct learning adaptation to adjust IQ pre-compensation filtering. Widely-linear IQ_mismatch pre-compensation filtering compensates for IQ mismatch in the TX analog chain, filtering of input data x(n) to provide pre-compensated data y(n) with a compensation image designed to interfere destructively with the IQ_mismatch image. A feedback receiver FBRX captures feedback data z(n) used for direct learning adaptation. DL adaptation adjusts IQ_mismatch filters, modeled as an x(n)_direct and complex conjugate x(n)_image transfer functions w1 and w2, including generating an adaptation error signal based on a difference between TX/FBRX-path delayed versions of x(n) and z(n), and can include estimation and compensation for TX/FBRX phase errors. DL adaptation adjusts the IQ pre-comp filters w1/w2 to minimize the adaptation error signal. Similar modeling can be used for IQ mismatch. The IQ_mismatch pre-compensator can be implemented as a combination of digital signal processing and hardware acceleration.

Other aspects and features of the invention claimed in this Patent Document will be apparent to those skilled in the art from the following Disclosure.

DETAILED DESCRIPTION

This Description and the Drawings constitute a Disclosure for TX IQ mismatch pre-compensation using direct learning adaptation for use in a direct conversion wireless transmitter architecture, including example embodiments that illustrate various technical features and advantages.

In brief overview, IQ mismatch pre-compensation using direct learning adaptation can be used in an direct conversion wireless transmitter to adjust IQ pre-compensation filtering. Widely-linear IQ_mismatch pre-compensation filtering compensates for IQ mismatch in the TX analog chain, filtering of input data x(n) to provide pre-compensated data y(n) with a compensation image designed to interfere destructively with the IQ_mismatch image. A feedback receiver FBRX captures feedback data z(n) used for direct learning adaptation. DL adaptation adjusts IQ_mismatch filters, modeled as an x(n)_direct and complex conjugate x(n)_image transfer functions w1 and w2, including generating an adaptation error signal based on a difference between TX/FBRX-path delayed versions of x(n) and z(n), and can include estimation and compensation for TX/FBRX phase errors. DL adaptation adjusts the IQ pre-comp filters w1/w2 to minimize the adaptation error signal. Similar modeling can be used for IQ mismatch. The IQ_mismatch pre-compensator can be implemented as a combination of digital signal processing and hardware acceleration.

Figure 1:
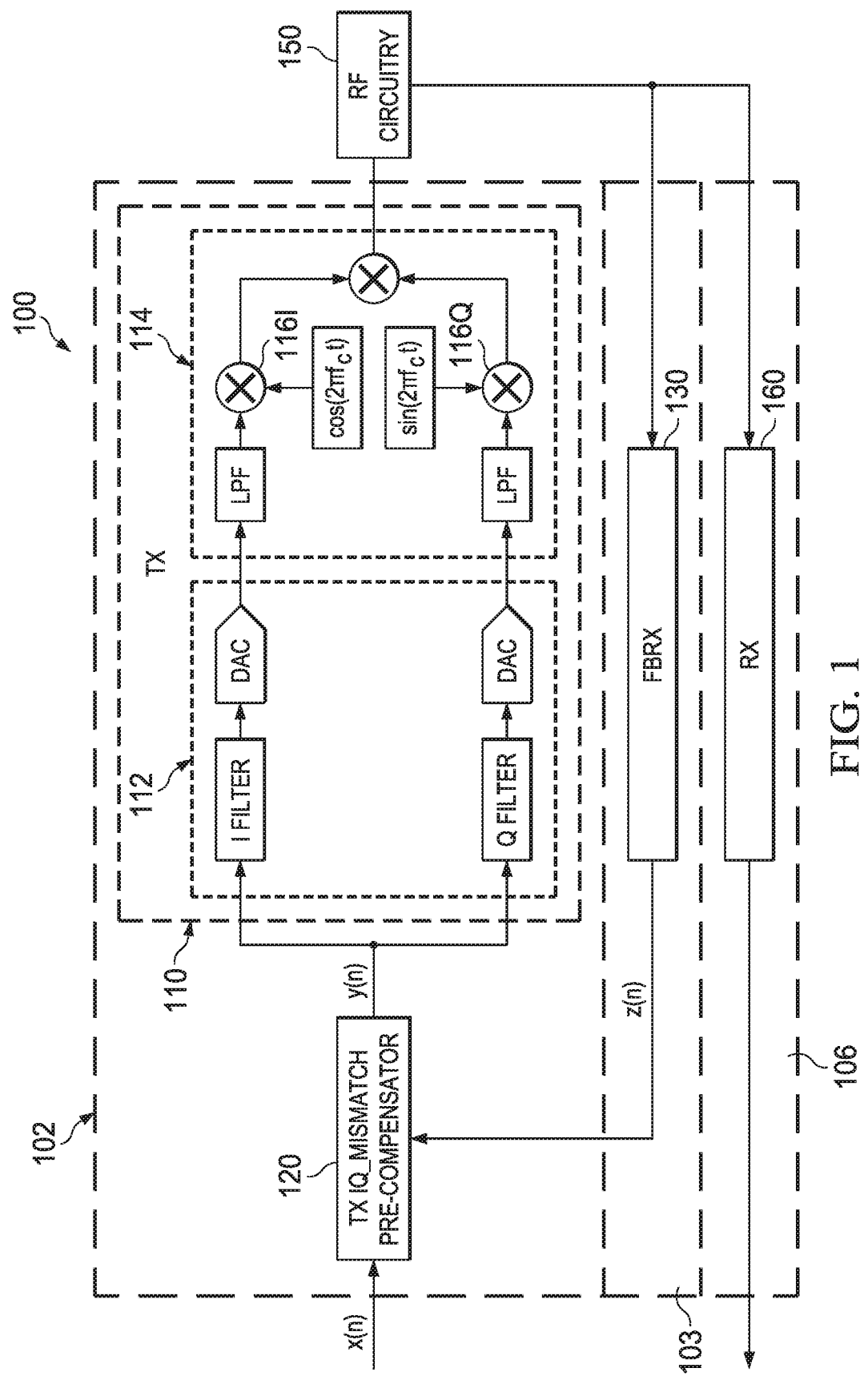
FIG. 1 illustrates an example functional embodiment of a wireless transceiver (100) including a direct conversion wireless transmitter (TX 110) with a TX IQ_Mismatch Pre-Compensator (120) and a Feedback Receiver (FBRX 140).

FIG. 1 illustrates an example functional embodiment of a wireless transceiver 100 that includes a transmit (TX) signal chain/path 102, a feedback receive (FBRX) signal chain/path 103, and a receive (RX) signal chain/path 106.

TX signal chain 102 is based on a direct conversion (zero/low-IF) architecture. It includes a direct conversion transmitter TX 110 providing IQ modulation and upconversion of a TX baseband analog signal to TX RF. The TX analog chain is characterized by an IQ mismatch/imbalance associated with IQ modulation and upconversion. IQ mismatch is manifested as an IQ_mismatch image that, without QMC, will appear in TX RF.

An IQ_Mismatch Pre-Compensator 120 in the TX signal chain 102 pre-filters input digital TX baseband data x(n), producing pre-compensated TX baseband data y(n). IQ_Mismatch Pre-Compensator 120 adaptively filters the input TX baseband data x(n) such that the resulting pre-compensated TX baseband data y(n) provided to the TX analog chain manifests a compensation image designed to interfere destructively with the IQ_mismatch image associated with IQ mismatch in the TX analog chain, suppressing the IQ_mismatch image from the TX RF (below adjacent channel signal interference requirements). A feedback receiver FBRX 130 in the FBRX signal path 103 captures data used by IQ_Mismatch Pre-compensator 120 for IQ_mismatch pre-compensation, converting the TX RF back to digital FBRX baseband data z(n).

The example transmitter TX 110 includes an IQ filter front end 112, and a TX upconverter 114 with IQ mixers 116I/116Q. IQ filter front end receives the pre-compensated TX baseband data y(n), providing IQ filtering for the real I and imaginary Q portions of the TX baseband data y(n), with DAC conversion to corresponding analog TX IQ baseband signals. TX upconverter 114 low-pass filters the TX IQ baseband signals, followed by upconversion to RF in IQ mixers 116I/116Q and summing.

RF circuitry 150 provides RF transmit and receive. TX RF is transmitted, and fed back to the FBRX signal path 103 (FBRX 130). Received RX RF is routed to the RX signal path 106, including a receiver RX 160.

As described in detail in connection with FIGS. 2 and 3, TX IQ_Mismatch Pre-Compensator 120 implements widely linear pre-compensation filtering with direct learning adaptation according to this Disclosure.

Pre-compensation filtering is widely linear in that the input TX baseband data x(n) and its complex conjugate are filtered. Pre-compensation filtering is modeled as an x(n)_direct transfer function w1 (receiving x(n) as input), and a complex conjugate x(n)_image transfer function w2 (receiving a complex conjugate of x(n) as input). Transfer functions w1 and w2 are designated IQ pre-comp filters.

IQ pre-comp filters w1 and w2 are adapted based on direct learning in that the IQ_Mismatch Pre-Compensator directly adjusts the IQ pre-comp filters (filter coefficients) in the signal path.

The example transceiver 100 in FIG. 1 is functionally illustrated with a direct conversion TX signal chain 102, including transmitter 110 and IQ_Mismatch Pre-Compensator 120, and associated FBRX signal chain 103 including feedback receiver FBRX 130. A separate RX signal path 106 includes receiver RX 160.

FBRX 130 and RX 160 can be based on direct conversion or heterodyne architectures. If FBRX 130 is a direct conversion architecture, it should be designed to provide the FBRX baseband data z(n), including downconversion mixing and IQ demodulation, without exhibiting significant IQ mismatch, such as by implementing IQ mismatch pre-compensation. FBRX 130 and RX 160 can be implemented as a shared receiver architecture.

Figure 2:
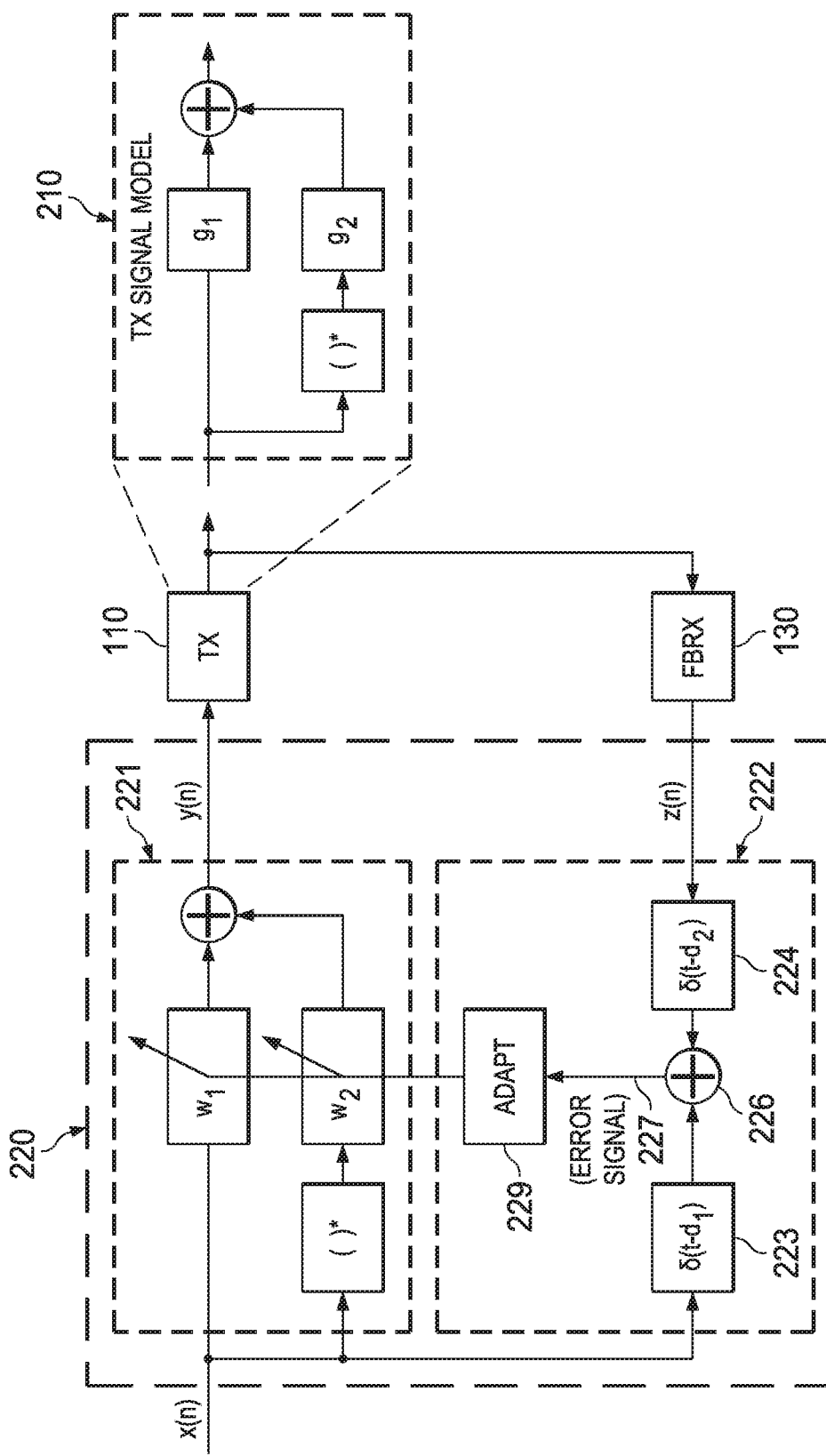
FIG. 2 illustrates an example functional embodiment of the TX IQ_Mismatch Pre-Compensator (220), including IQ pre-comp filters (221) (direct and complex conjugate image transfer functions w1 and w2), with direct learning adaptation (222) of the IQ pre-comp filters (w1/w2), including transmit/feedback signal path delay compensation (223/224).

FIG. 2 illustrates an example functional embodiment of the TX IQ_Mismatch Pre-Compensator 220, configured for IQ pre-compensation filtering with direct learning adaptation. IQ_Mismatch Pre-Compensator 220 includes IQ pre-compensation filtering 221, modeled as an x(n)_direct transfer function w1 (receiving x(n) as input), and a complex conjugate x(n)_image transfer function w2 (receiving a complex conjugate of x(n) as input), designated as IQ pre-comp filters w1 and w2.

For the example embodiment, IQ_Mismatch Pre-Compensator 220 is implemented by digital signal processing, such as in a digital signal processor (DSP) or microprocessor unit (MPU), in combination with hardware acceleration for certain functions that are computationally expensive. For example, hardware acceleration can be used for auto-correlation of x(n) and z(n), and cross-correlation between x(n) and z(n).

IQ_Mismatch Pre-Compensator 220 receives input TX baseband data x(n), and feedback FBRX baseband data z(n), and produces pre-compensated TX baseband data y(n). IQ_Mismatch Pre-Compensator 220 implements IQ pre-compensation filtering 221, with direct learning filter adaptation 222. The pre-compensated TX baseband data y(n) is input to TX 110 for IQ modulation and upconversion to RF, providing IQ_mismatch image suppression through destructive interference with the y(n) compensation image (below any adjacent channel signal interference requirements).

For the example embodiment, IQ_Mismatch Pre-Compensator 220 adjusts the IQ pre-comp filters w1 and w2 based on a linear combination of direct learning adaptations for successive data blocks. IQ pre-comp filters w1 and w2 are fixed during data block capture. For each data block, IQ_Mismatch Pre-compensator 220 performs direct learning adaptation, which adaptations are stored for linear combination before the IQ pre-comp filters are adjusted.

Direct learning adaptation 222 adapts the IQ pre-comp filters w1/w2 as a direct learning adaptation based on the input TX baseband data x(n) and feedback FBRX baseband data z(n), including estimating delay through the respective TX and FBRX signal chains (FIGS. 1, 102 and 103).

Functionally, IQ_Mismatch Pre-Compensator 220 includes a TX delay estimator 223 and a FBRX delay estimator 224. TX delay estimator 223 modifies the input TX baseband data x(n) corresponding to a delay through the TX signal path, producing a delayed version of x(n). FBRX delay estimator 224 modifies feedback FBRX baseband data z(n) corresponding to a delay through the FBRX signal path, producing a delayed version of z(n).

A TX/FBRX error signal generator 226, such as a signal subtractor, generates an adaptation error signal 227 corresponding to a difference between respective delayed versions of x(n) and z(n).

A DL adapter 229 implements a direct learning adaption of the IQ_mismatch pre-compensation filters w1 and w2, based on the adaptation error signal 227. DL adapter 229 performs direct learning adaptation to adjust IQ pre-comp filters w1 and w2 (filter coefficients) to minimize the adaptation error signal.

As noted above, for the example embodiment, IQ_Mismatch Pre-Compensator 220 is implemented by digital signal processing in combination with hardware acceleration for certain functions that are computationally expensive. For example, hardware acceleration can be used for auto-correlation of x(n) and z(n), and cross-correlation between x(n) and z(n). Further, hardware acceleration can be used for some combination of TX delay estimation, FBRX delay estimation, TX/FBRX error signal generation, and DL adaptation.

DL adapter 226 can be configured to minimize the adaptation error (and achieve convergence of the IQ pre-comp filters w1/w2 that converges in the direction of an estimated steepest descent, according to the vector expression $w[n]=w[n-1]-\mu\Delta w[n]$, where $w[n]$ is the filter state vector for the filter update, and $\Delta w[n]$ is a steepest descent vector for the estimated direction of the steepest descent. The steepest descent vector $\Delta w[n]$ is related to an error vector ($e[n]$) for the adaptation error signal by a Jacobian matrix, denoted $e=J(\Delta w)$.

The update to the filter state vector can be based on a least-squares solution, expressed as $w[n+1]=w[n]-\mu(J^H J)^{-1}(J^H e[n])$, where $[\Delta w[n]=(J^H J)^{-1}(J^H e[n])]$ is a least-squares estimation for the direction of steepest descent. Alternative approaches to determining the filter state vector include using a conjugate gradient algorithm, and using a Kalman filter.

Convergence of the direct learning adaptation of the IQ pre-comp filters w1/w2 depends in part on the design of the TX analog chain. IQ_mismatch associated with TX 110 can be modeled by a y(n)_direct transfer function $g_1(f)$ ((receiving y(n) as input), and a complex conjugate y(n)_image transfer function $g_2(f)$ (receiving a complex conjugate of y(n) as input). TX 110 (FIG. 1, analog chain 114) can be designed such that direct learning adaption converges based on: (a) $\|g_1(f)\|\approx 1$, (b) $g_2(f)\|$ is in the range of 30 dB less than $\|g_1(f)\|$, and (c) $\|1-g_1(f)\|<1$.

Referring to FIG. 1, implementations of the TX and FBRX signal chains can cause phase variations that require compensation. For example, TX 110 can be designed for multiple transmit channels (multiple carrier frequencies), and for multiple calibration functions, with FBRX 130 shared between channels and calibration functions. In addition, FBRX can be used to capture data for both IQ mismatch compensation in the TX signal chain, and DPD (digital pre-distortion) for the power amplifier. When the FBRX carrier frequency alternates, the phase difference between TX and FBRX mixers changes.

Figure 3:
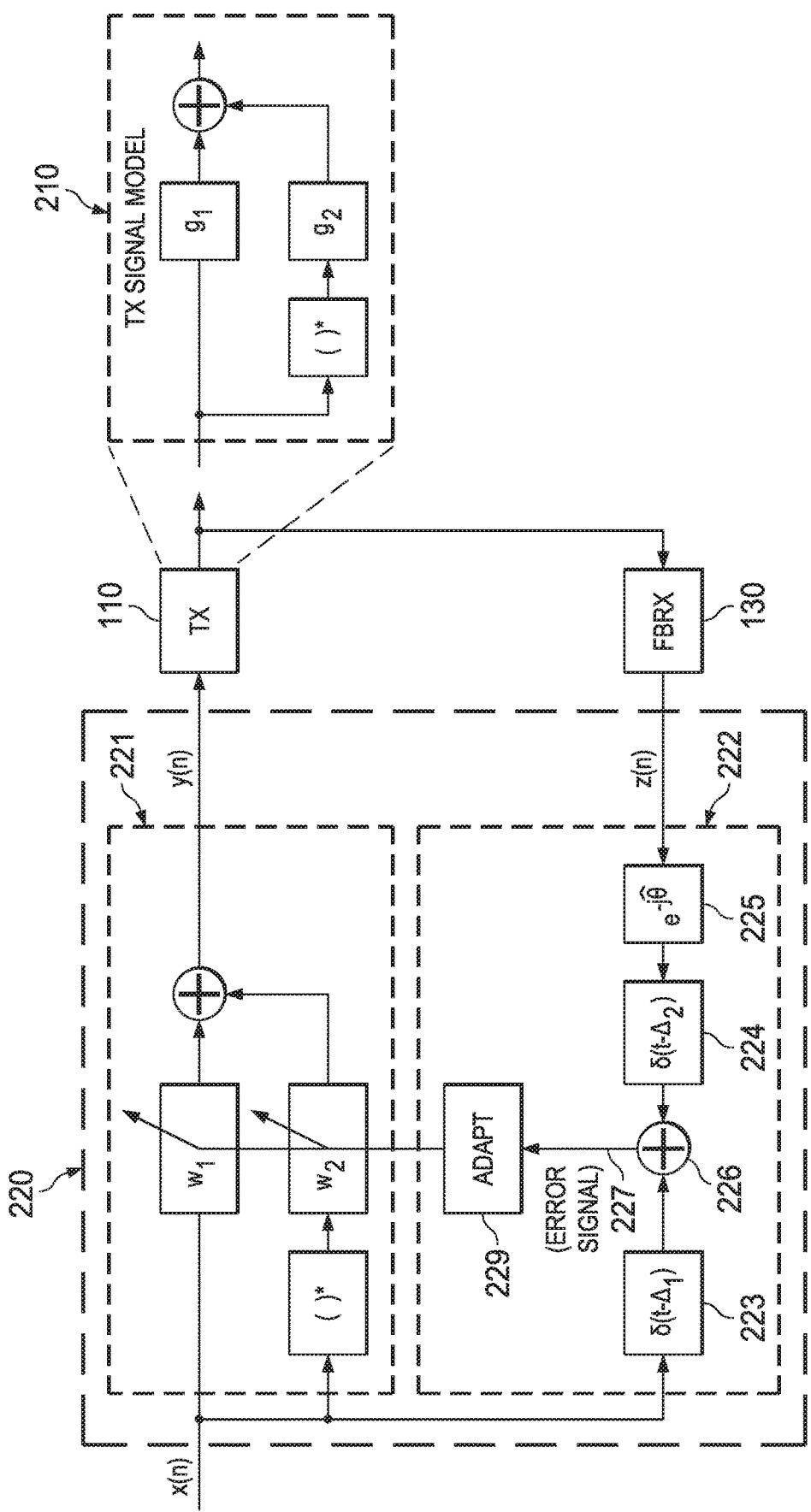
FIG. 3 illustrates an example functional embodiment of the TX IQ_Mismatch Pre-Compensator (220), including IQ pre-comp filters (w1/w2 (direct and complex conjugate transfer functions w1 and w2), with direct learning adaptation (222), including transmit/feedback signal path delay compensation (223/224), and including phase error estimation/compensation (225).

FIG. 3 illustrates an example functional embodiment of the TX IQ_Mismatch Pre-Compensator (220) in which phase error can be estimated and corrected in the correlation computation for direct learning adaptation.

TX IQ_Mismatch Pre-Compensator 220, direct learning adaptation 222, can include phase error estimation 225. Specifically, direct learning adaptation 222 can be configured to estimate a phase error between the TX upconversion and FBRX downconversion, represented as phase error estimator 225. DL adapter 229 can implement direct learning adaptation including phase error compensation according to the phase of a complex number generated in DL adapter 229 by a cross-correlation between the TX baseband data x(n) and the FBRX baseband data z(n).

TX IQ mismatch compensation with direct learning adaptation of IQ pre-compensation filtering according to this Disclosure has a number of advantages. Direct learning adaptation can compensate and track fully frequency-dependent TX IQ mismatch, independent of the frequency band of the transmitted signal. A widely-linear digital filter design is used to mitigate interference by producing an image in the baseband (digital) domain that cancels the IQ_mismatch image resulting from IQ mismatch in the TX analog chain, so that any resulting image is below adjacent channel signal interference requirements. IQ pre-compensation filter coefficients are adapted to handle arbitrary broadband TX signal spectra, and to track mismatch variations due to factors such as temperature drift.

The Disclosure provided by this Description and the Figures sets forth example embodiments and applications illustrating aspects and features of the invention, and does not limit the scope of the invention, which is defined by the claims. Known circuits, functions and operations are not described in detail to avoid obscuring the principles and features of the invention. These example embodiments and applications can be used by ordinarily skilled artisans as a basis for modifications, substitutions and alternatives to construct other embodiments, including adaptations for other applications.

APPENDIX

Direct Learning Adaptation Algorithms for
Transmit IQ Mismatch Compensation

1. Quadrature Mismatch Modeling in Direct Conversion

The complex base-band signal $x_{BB}(t)$ is given represented by two real signals $x_R(t)$ and $x_I(t)$, corresponding to the real and imaginary parts. The conversion between digital and analog is represented by filtering with ideal low-pass filters denoted $h_{LPF}(t)$ that limit the signal to the desired channel bandwidth. The resulting signals are converted to pass-band signals at carrier frequency $f_c$ in the mixer. The mixer multiplies the real signal with $\cos(2\pi f_c t)$, and the imaginary signal with $-\sin(2\pi f_c t)$. The two analog signals are combined to a single signal in the balun, and the output waveform is equivalent to $x_{PB}(t)=\mathrm{Re}[x_{BB}(t)e^{j2\pi f_c t}]$. At the receiver, the pass-band signal is processed by the down-conversion mixer. The output is filtered by a pair of low-pass filters to recover the original real and imaginary parts of the complex base-band waveform. The outputs of the down-conversion mixer are $$x_{PB}(t)\cos(2\pi f_c t)=x_R(t)\cos^2(2\pi f_c t)-x_I(t)\cos(2f_c t)\sin(2\pi f_c t)$$

$$-x_{PB}(t)\sin(2\pi f_c t)=-x_R(t)\cos^2(2\pi f_c t)\sin(2\pi f_c t)+x_I(t)\sin^2(2\pi f_c t).$$

The trigonometric identities relating quadratic products of sines and cosines with signals at twice the frequency can be used to expand the terms in these equations. The signals proportional to $\cos^2(2\pi f_c t)$ and $\sin^2(2\pi f_c t)$ contain DC components with a gain of ½ that are not rejected by the low-pass filters. For example, the first term is $x_R(t)\cos^2(2\pi f_c t)=x_R(t)/2(1+\cos(2\pi(2f_c)t))$. The signal energy in the term at $2f_c$ is eliminated by the low-pass filter. The term $\cos(2\pi f_c t)\sin((2\pi f_c t)$ has all of its energy near $2f_c$ since $\sin(a)\cos(a)=\sin(2a)/2$, so the signals proportional to it are rejected completely by the low-pass filters. The output of the receiver is $$2h_{LPF}(t) \otimes \{x_{PB}(t)\cos(2\pi f_c t)\} = x_R(t)$$

$$2h_{LPF}(t) \otimes \{-x_{PB}(t)\sin(2\pi f_c t)\} = x_I(t).$$

The symbol $\otimes$ denotes convolution. Note that a gain of 2 has been included in the low-pass filter responses to scale the output properly.

A simple model of frequency-dependent IQ mismatch occurs when the linear filtering in the transmitter paths for $x_R(t)$ and $x_I(t)$ is mismatched, and when the phases in the branches of the up-conversion mixer do not match the correct phase of the down-conversion mixer.

The impulse response for the real signal path is $p_R(t)$, and the impulse response for the imaginary signal path is $p_I(t)$. These impulse responses account for frequency-dependent mismatch as well as gain mismatch between signal paths. In this system, there are four mixer phases. One can be set to zero arbitrarily as a reference phase. In this case, we have chosen the receiver cosine term as the reference phase. Additionally, we have assumed no phase mismatch between the mixers at the receiver to focus on the effect of transmitter mismatch. The unconstrained phase variables describe the phase mismatch between the transmitter mixers and the receiver reference phase. The phase error for the real signal path up-conversion mixer is $\phi_R$, and the phase error for the imaginary signal path is $\phi_I$. The phase error in the up-conversion mixer produces cross-talk between the real and imaginary components of the base-band signal. The mixing sequences can be written $$\cos(2\pi f_c t + \phi_R) = \cos(2\pi f_c t)\cos(\phi_R) - \sin(2\pi f_c t)\sin(\phi_R)$$

$$-\sin(2\pi f_c t + \phi_I) = -\cos(2\pi f_c t)\cos(\phi_I) - \sin(2\pi f_c t)\cos(\phi_I).$$

The cross-talk terms can be separated from mixing, so that the block diagram of the system can be re-drawn to resemble the original zero-IF system. From the mixer input onwards, the new system is identical to the zero-IF communication system. For example, the term $(x_R(t) \otimes p_R(t))\cos(2\pi f_c t + \phi_R)$ can be expanded to $\cos(\phi_R)(x_R(t) \otimes p_R(t))\cos(2\pi f_c t) + \sin(\phi_R)(x_R(t) \otimes p_R(t))(-\sin(2\pi f_c t))$. This portion of the output signal can be generated by feeding the cosine mixer with the input $\cos(\phi_R)(x_R(t) \otimes p_R(t))$ and the sine mixer the input $\sin(\phi_R)(x_R(t) \otimes p_R(t))$. The other terms are generated in the same way from the imaginary input. The base-band output is the pair of signals entering the ideal mixers in the transmitter side.

The base-band equivalent signal model for the system is given by four filters with real-valued impulse responses. In the time-domain, the received base-band signal is given by $$y_R(t) = g_{RR}(t) \otimes x_R(t) + g_{RI}(t) \otimes x_I(t)$$

$$y_I(t) = g_{IR}(t) \otimes x_R(t) + g_{II}(t) \otimes x_I(t).$$

In terms of the original parameters of the mismatch model, the base-band filter responses are $$g_{RR}(t) = p_R(t)\cos(\phi_R) \quad g_{RI}(t) = -p_I(t)\sin(\phi_I)$$

$$g_{IR}(t) = p_R(t)\sin(\phi_R) \quad g_{II}(t) = p_I(t)\cos(\phi_I).$$

In the frequency domain, the output signal spectrum can be represented as a matrix multiplication between the input signal components and a 2-by-2 matrix of transfer functions. The baseband model in these variables is $$\begin{bmatrix} Y_R(f) \\ Y_I(f) \end{bmatrix} = \begin{bmatrix} G_{RR}(f) & G_{RI}(f) \\ G_{IR}(f) & G_{II}(f) \end{bmatrix} \begin{bmatrix} X_R(f) \\ X_I(f) \end{bmatrix}.$$

This model is general enough to expand beyond the simple mixer cross-talk assumed at the beginning of the section. Even if there is frequency-dependent cross-talk between in mixer, or cross-talk in previous portions of the analog signal chain, the resulting base-band output can be expressed in this form.

Changing the input or output variables produces equivalent formulations of the base-band channel model for IQ mismatch [2,3]. The transmitter output variable can be changed from real to complex-valued. The updated model is $$y(t) = (g_{RR}(t) + jg_{IR}(t)) \otimes x_R(t) + (g_{RI}(t) + jg_{II}(t)) \otimes x_I(t) = g_R(t) \otimes x_R(t) + g_I(t) \otimes x_I(t)$$

The new channel models are complex-valued impulse responses, but the input variables are still real-valued. A further transformation represents the real and imaginary components of the input base-band signal with the signal and its conjugate. The resulting model is $$y = g_R(t) \otimes \frac{(x(t) - x^*(t))}{2} + g_I(t) \otimes \frac{(x(t) - x^*(t))}{2j}$$

$$= \frac{1}{2}(g_R(t) - jg_I(t)) \otimes x(t) + \frac{1}{2}(g_R(t) + jg_I(t)) \otimes c^*(t)$$

$$= g_d(t) \otimes x(t) + g_m(t) \otimes x^*(t).$$

The new channel models in terms of the complex base-band input and its conjugate are formed by sums and differences of the channel models based on real and imaginary parts of the input. The channel $g_d(t)$ uses the subscript 'd' to denote that it is the direct path from the input base-band signal to the output signal. This is referred to as the signal path filter. The channel $g_m(t)$ uses the subscript 'm' to denote that it is the path of the mirror image signal $x^*(t)$ to the output. This is referred to as the conjugate path or image path filter. The complex conjugate is referred to as the mirror image signal because its signal band is a reflected version of the original signal band. The frequency domain representation is $x^*(t) \leftrightarrow X^*(-f)$. If the input signal band is $f=[f_a, f_b]$, then the band containing energy for the complex conjugate signal is the mirror image band $f=[-f_b, -f_a]$. A system of this type, generated by filtering the input signal and its conjugate, is typically called widely linear [4].

We have derived the IQ mismatch models in terms of the continuous-time channels and mixer parameters. In practice, full information about the behavior of these channels is not available. The IQ mismatch estimation and correction take place in the digital domain. The continuous-time responses model the behavior of the system over all frequencies. In the digital domain, the transfer function is not observable for frequencies outside of the band determined by the carrier frequency $f_c$ and the sampling frequency $f_s$ used for the transmitter and feedback receiver digital base-band module. For discrete-time models of the mismatch, the continuous-time input signal is generated via digital-to-analog conversion of the discrete-time digital base-band signal $x[n]=x_R[n]+x_I[n]$. The feedback receiver output signal is sampled at the same frequency, and is written $y[n]=y_R[n]+y_I[n]$. The equivalent channel models are represented as discrete-time signals that satisfy relationships such as $G_d(e^{j\omega})=G_d(f_c+(\omega f_s)/(2\pi))$ for discrete-time frequencies that satisfy −π≤ω≤π. The transformations between the three representations for the IQ mismatch are the same in discrete-time and continuous-time. The discrete-time channel responses are denoted through use of square brackets in the time domain, i.e. x[n], and through use of the discrete frequency variable ω, traditionally measured in radians per sample.

The three models for IQ mismatch can be applied to mismatch in the receiver as well as the transmitter. The receiver mismatch can be modeled as 2-by-2 matrix of real channel impulse responses. The relationship between these responses and the parameters of the receiver filters and mixers is differs from the transmitter mismatch case. In the transmitter, denote the phase error in the real branch as $\phi_R'$ and the phase error in the imaginary branch as $\phi_I'$. Likewise, denote the impulse response of the real branch low-pass filter by $p_R'(t)$ and the impulse response of the imaginary branch low-pass filter by $p_I'(t)$.

Using the trigonometric identities for the sum of two angles, the mixing sequences can be expanded in terms of $\cos(2\pi f_c t)$ and $\sin(2\pi f_c t)$ with cross-talk terms dependent on the mismatch parameters.

Based on the equivalent system diagram with mixer cross-talk, the real-valued channel responses are $$g_{RR}'(t)=p_R'(t)\cos(\phi_R') \quad g_{RI}'(t)=p_R'(t)\sin(\phi_R')$$

$$g_{IR}'(t)=-p_I'(t)\sin(\phi_I') \quad g_{II}'(t)=p_I'(t)\cos(\phi_I')$$

in terms of the mismatch variables for the receiver. These channel models can be transformed into the two alternative forms using the same techniques used for transmitter IQ mismatch. The pairs of real-valued responses can be merged to produce a complex-valued output model. Additionally, the average and difference of these complex-valued responses can be formed to produce the direct signal path channel model and the mirror image signal model. Finally, the channel responses can be represented by discrete-time frequency responses that agree with the corresponding continuous time responses over the frequency band of interest.

2. Compensation Filter Architectures

The IQ mismatch can be compensated in two different locations. At the receiver, post-compensation processes the receiver output with a widely linear system designed to eliminate the undesired image in the signal. The post-compensation is needed in the data traffic receiver in order to accurately receive and decode the transmitted signal. Particularly, it is needed to avoid images from strong blockers interfering with weaker signals. In the feedback receiver, the post-compensation is required to provide an accurate feedback signal for the adaptation algorithms of digital pre-distortion and transmitter IQ mismatch compensation.

In the transmitter, a pre-compensation filter can be used to eliminate the undesired image from the transmit signal power spectrum. The pre-compensator is a widely-linear system. It generates an image in the baseband output signal that is precisely calibrated to cancel the image created when the pre-compensated signal passes through the analog transmit chain. The image cancellation is needed to ensure proper operation of DPD, and to meet the ACLR requirements for the transmitter.

2.1. Post-Compensation Filter Responses

The post-compensation filter is a widely-linear system following the analog receiver. The output of the post-compensation filter has no image due to mismatch when the filter is compensated correctly. This section derives the transfer function for feasible post-compensation filters given the transfer function of the widely linear transmitter.

The widely-linear system for the transmitter is modeled by the transfer function matrix)

$$G(e^{j\omega}) = \begin{bmatrix} G_{RR}(e^{j\omega}) & G_{RI}(e^{j\omega}) \\ G_{IR}(e^{j\omega}) & G_{II}(e^{j\omega}) \end{bmatrix}.$$

When the input and output variables are real and imaginary components, and by the filter impulse responses $g_d[n]$ and $g_m[n]$ when the input are the complex baseband signal and its image. The associated transfer functions are denoted $G_d(e^{j\omega})$ and $G_m(e^{j\omega})$. The associated transfer functions for the post-compensation filter are given by $$W(e^{j\omega}) = \begin{bmatrix} W_{RR}(e^{j\omega}) & W_{RI}(e^{j\omega}) \\ W_{IR}(e^{j\omega}) & W_{II}(e^{j\omega}) \end{bmatrix},$$

$W_d(e^{j\omega})$, and $W_m(e^{j\omega})$.

The composite system is also a widely-linear system. The characterization of the composite system is given by the transfer function matrix $$T(e^{j\omega}) = \begin{bmatrix} T_{RR}(e^{j\omega}) & T_{RI}(e^{j\omega}) \\ T_{IR}(e^{j\omega}) & T_{II}(e^{j\omega}) \end{bmatrix} = W(e^{j\omega})G(e^{j\omega}).$$

In terms of the filter impulse responses, the complex base-band output signal is $$z[n]=(w_d[n]\otimes g_d[n]+w_m[n]\otimes g_m^*[n])\otimes x[n]+(w_d[n]\otimes g_m[n]+w_m[n]\otimes g_d^*[n])\otimes x^*[n].$$

The equivalent expression in the frequency, domain is $$Z(e^{j\omega})=(W_d(e^{j\omega})G_d(e^{j\omega})+W_m(e^{j\omega})G_m^*(e^{-j\omega}))X(e^{j\omega})+(W_d(e^{j\omega})G_m(e^{j\omega})+W_m(e^{j\omega})G_d^*(e^{-j\omega}))X^*(e^{-j\omega})$$

The post-compensation filters achieve image cancellation when the term proportional to $X^*(e^{j\omega})$ is zero over the frequency band containing the image signal. The cancellation condition on this signal band can be re-arranged to give a necessary constraint between the compensation filters. The updated cancellation condition is $$W_m(e^{j\omega}) = -\frac{G_m(e^{j\omega})W_d(e^{j\omega})}{G_d^*(e^{-j\omega})}$$

for frequencies in the image band. The transfer function components of this image cancellation condition are easily determined from observing the channel output with a known input. The term $G_m(e^{j\omega})$ can be determined on the image band. Additionally, the term $G_d^*(e^{-j\omega})$ is the conjugate of transfer function for the signal band, and can always be estimated from the channel output.

The post-compensation filters also shape the output spectrum on the signal band. The transfer function is the term proportional to $X(e^{j\omega})$. The filters on this band can be set to determine the desired output transfer function. A common choice is to set the output to fully equalize the output channel, i.e. requiring that the output signal be given by $(W_d(e^{j\omega})G_d(e^{j\omega})+W_m(e^{j\omega})G_m^*(e^{-j\omega}))X(e^{j\omega})=D(e^{j\omega})X(e^{j\omega})$, where $D(e^{j\omega}))=1$ over the entire signal band.

Consider a case where the frequency $\omega_o$ falls in both the signal and image bands. In this situation, the mirror image signal $-\omega_o$ also falls in both bands. In this situation, there are four equations in four unknowns that specify the behavior of the post-compensation filter. There are two equations from the requirement for image cancellation, and two equations from the requirement for channel equalization. There are two unknowns form the signal path filter response at $\omega_o$ and $-\omega_o$, and two more unknowns from the conjugate path filter response at the same locations. It is expected that this system is non-singular for typical behavior of the analog receive chain transfer functions. The full system of equations is given by $$W_d(e^{j\omega_o})G_d(e^{j\omega_o})+W_m(e^{j\omega_o})G_m^*(e^{-j\omega_o})=D(e^{j\omega_o})$$

$$W_d(e^{-j\omega_o})G_d(e^{-j\omega_o})+W_m(e^{j\omega_o})G_m^*(e^{j\omega_o})=D(e^{-j\omega_o}).$$

$$W_d(e^{j\omega_o})G_m(e^{j\omega_o})+W_m(e^{j\omega_o})G_d^*(e^{-j\omega_o})=0$$

$$W_d(e^{-j\omega_o})G_d(e^{-j\omega_o})+W_m(e^{-j\omega_o})G_d^*(e^{j\omega_o})=0$$

The number of unknowns and equations matches, so the compensation filter transfer functions can be fully determined by solving the system of equations. Due to the symmetry of the system of equations, the functional form for the filter responses is the same for $\omega_o$ and $-\omega_o$. The responses can be determined by changing the sign of the frequency variable. The solution to this system of equations is given by $$W_d(e^{j\omega_o}) = \frac{D(e^{j\omega_o})G_d^*(e^{-j\omega_o})}{G_d(e^{j\omega_o})G_d^*(e^{-j\omega_o}) - G_m(e^{j\omega_o})G_m^*(e^{-j\omega_o})}$$

$$W_m(e^{j\omega_o}) = \frac{-D(e^{j\omega_o})G_m(e^{j\omega_o})}{G_d(e^{j\omega_o})G_d^*(e^{-j\omega_o}) - G_m(e^{j\omega_o})G_m^*(e^{-j\omega_o})}.$$

In other situations, the frequency band occupied by the signal may be non-symmetric. There will be frequencies $\omega_1$ that belong to the signal band but not the image band. In this case, the frequency $-\omega_1$ is the corresponding image frequency. For the post-compensator to work correctly, the equalization condition must be satisfied at $\omega_1$, and the image cancellation condition must be satisfied at $-\omega_1$. There are only two equations in four unknowns that must be satisfied, so the compensation transfer functions are not completely determined by these conditions. For the asymmetric case, the requirements are $$W_d(e^{j\omega_1})G_d(e^{j\omega_1})+W_m(e^{j\omega_1})G_m^*(e^{-j\omega_1})=D(e^{j\omega_1}).$$

$$W_d(e^{-j\omega_1})G_m(e^{-j\omega_1})+W_m(e^{j\omega_1})G_d^*(e^{j\omega_1})=0$$

The system of 2 equations in 4 unknowns has the solution to the fully symmetric case as a particular solution, but many other filters also satisfy the conditions. The symmetric case solution can be modified by according to the rule $$w_d'[n]=w_d[n]+a_d[n]$$

$$w_m'[n]=w_m[n]+a_m[n]'$$

where $w_d[n]$ and $w_m[n]$ are post-compensation filters for the symmetric signal band case, so long as the transfer functions of modification filters $a_d[n]$ and $a_m[n]$ satisfy the condition $$A_d(e^{j\omega_1})G_d(e^{j\omega_1})+A_m(e^{j\omega_1})G_m^*(e^{-j\omega_1})=0$$

$$A_d(e^{-j\omega_1})G_m(e^{-j\omega_1})+A_m(e^{-j\omega_1})G_d^*(e^{j\omega_1})=0.$$

When this condition holds, the new post-compensator continues to satisfy the desired equalization conditions.

2.2 Pre-Compensation Filter Responses

The pre-compensation filter is a widely-linear digital filter that is applied prior to signal transmission. It produces an image signal prior in the digital baseband that is intended to destructively interfere with the image that is produced by the analog mismatches in the transmitter. This section determines the allowable transfer functions for the pre-compensation filters.

Again, the baseband equivalent widely linear system for the transmitter can be modeled via a transfer function matrix $$G(e^{j\omega}) = \begin{bmatrix} G_{RR}(e^{j\omega}) & G_{RI}(e^{j\omega}) \\ G_{IR}(e^{j\omega}) & G_{II}(e^{j\omega}) \end{bmatrix}$$

when the input is treated as real and imaginary components, or via the complex filters $g_d[n]$ and $g_m[n]$ when the input are the complex baseband signal and its image. The associated transfer functions are denoted $G_d(e^{j\omega})$ and $G_m(e^{j\omega})$. The associated transfer functions for the pre-compensation filter are given by $$W(e^{j\omega}) = \begin{bmatrix} W_{RR}(e^{j\omega}) & W_{RI}(e^{j\omega}) \\ W_{IR}(e^{j\omega}) & W_{II}(e^{j\omega}) \end{bmatrix},$$

$W_d(e^{j\omega})$, and $W_m(e^{j\omega})$.

The composite system is also a widely-linear system. The characterization of the composite system is given by the transfer function matrix $$T(e^{j\omega}) = \begin{bmatrix} T_{RR}(e^{j\omega}) & T_{RI}(e^{j\omega}) \\ T_{IR}(e^{j\omega}) & T_{II}(e^{j\omega}) \end{bmatrix} = G(e^{j\omega})W(e^{j\omega}).$$

In terms of the filter impulse responses, the complex base-band output signal is $$y[n]=(g_d[n]\otimes w_d[n]+g_m[n]\otimes w_m^*[n])\otimes x[n]+(g_d[n]\otimes w_m[n]+g_m[n]\otimes w_d^*[n])\otimes x^*[n].$$

The equivalent expression in the frequency domain is $$Y(e^{j\omega})=(G_d(e^{j\omega})W_d(e^{j\omega})+G_m(e^{j\omega})W_m^*(e^{-j\omega}))X(e^{j\omega})+ (G_d(e^{j\omega})W_m(e^{j\omega})+G_m(e^{j\omega})W_d^*(e^{-j\omega}))X^*(e^{-j\omega})$$

The expressions for the system output are similar to the post-compensation case, with the roles of $G_d(e^{j\omega})$ and $W_d(e^{j\omega})$ interchanged, and $G_m(e^{j\omega})$ and $W_m(e^{j\omega})$ interchanged.

The interchange of variables produces an important difference between the image cancellation conditions for pre-compensation and for post-compensation. When the term weighting $X^*(e^{-j\omega})$ is set to zero in the output equation, the resulting image cancellation condition is $$W_m(e^{j\omega}) = -\frac{G_m(e^{j\omega})W_d^*(e^{-j\omega})}{G_d(e^{j\omega})}.$$

The change in dependence on $W_d^*(e^{-j\omega})$ is not important since the compensation filters are fully known. The change in the denominator to $G_d(e^{j\omega})$ has important consequences for determining a pre-compensator that cancels the undesired image signal. Since the image cancellation is enforced only on the image band, the denominator term requires knowledge $G_d(e^{j\omega})$ on the image frequency band. When the feedback receiver output is observed prior to the introduction of the pre-compensation filter, it is possible to estimate $G_d$ on the signal band and $G_m$ on the image band. When the image band and signal band do not coincide, there are some frequencies where the denominator in the image cancellation condition is unknown. The necessary variables are not observed in a single-pass channel estimate when the input signal has an asymmetric signal band. This issue is addressed in depth in Section 3 and 4.

For the case where the signal spectrum is symmetric, it is possible to easily observe the channel responses and determine the pre-compensation transfer functions. Le $\omega_o$ be a frequency that belongs to both the signal and image frequency bands. As before, we require an equalization condition on the signal band, i.e. $(G_d(e^{j\omega})W_d(e^{j\omega})+G_m(e^{j\omega})W_m^*(e^{-j\omega}))X(e^{j\omega})=D(e^{j\omega})X(e^{j\omega})$, where $D(e^{j\omega})=1$ over the entire signal band. There are four equations in four unknowns for the symmetric signal band case. They are given by)

$$G_d(e^{j\omega_o})W_d(e^{j\omega_o})+G_m(e^{j\omega_o})W_m^*(e^{-j\omega_o})=D(e^{j\omega_o})$$

$$G_d(e^{-j\omega_o})W_d(e^{-j\omega_o})+G_m(e^{-j\omega_o})W_m^*(e^{j\omega_o})=D(e^{-j\omega_o})$$

$$G_d(e^{j\omega_o})W_m(e^{j\omega_o})+G_m(e^{j\omega_o})W_d^*(e^{-j\omega_o})=0$$

$$G_d(e^{-j\omega_o})W_m(e^{-j\omega_o})+G_m(e^{-j\omega_o})W_d^*(e^{j\omega_o})=0.$$

These equations fully determine the transfer functions for the pre-compensation filters. Once again, the solutions are symmetric, so they are written in terms of the positive frequency $\omega_o$ only. They are given by $$W_d(e^{j\omega_o}) = \frac{D(e^{j\omega_o})G_d^*(e^{-j\omega_o})}{G_d(e^{j\omega_o})G_d^*(e^{-j\omega_o}) - G_m(e^{j\omega_o})G_m^*(e^{-j\omega_o})}$$

$$W_m(e^{j\omega_o}) = \frac{-D^*(e^{-j\omega_o})G_m(e^{j\omega_o})}{G_d(e^{j\omega_o})G_d^*(e^{-j\omega_o}) - G_m(e^{j\omega_o})G_m^*(e^{-j\omega_o})}.$$

The pre-compensation filter responses are similar to the previously derived expressions for the post-compensation filters. They agree as long as the desired channel response is conjugate symmetric ($D(e^{j\omega_o})=D^*(e^{-j\omega_o})$), or equivalently has a real-valued impulse response. Since the desired channel response is typically a delay, this condition usually holds. This equivalence implies that filters derived as post-compensators can be used as pre-compensators as well, provided the signal band is symmetric. Using compensation filters designed for post-compensation as pre-compensation is often called indirect learning.

As for the post-compensator, the solution for an asymmetric signal spectrum is not fully specified. There are only two equations in four unknowns that must be satisfied, so the compensation transfer functions are not completely determined by these conditions. For the asymmetric case, the pre-compensation requirements are $$G_d(e^{j\omega_1})W_d(e^{j\omega_1})+G_m(e^{j\omega_1})W_m^*(e^{-j\omega_1})=D(e^{j\omega_1})$$

$$G_d(e^{-j\omega_1})W_m(e^{-j\omega_1})+G_m(e^{-j\omega_1})W_d^*(e^{j\omega_1})=0.$$

The system of 2 equations in 4 unknowns has the solution to the fully symmetric case as a particular solution, but many other filters also satisfy the conditions. The symmetric case solution can be modified by according to the rule $$w_d'[n]=w_d[n]+a_d[n]$$

$$w_m'[n]=w_m[n]+a_m[n]'$$

so long as the transfer functions of modification filters satisfy the condition $$G_d(e^{j\omega_1})A_d(e^{j\omega_1})+G_m(e^{j\omega_1})A_m^*(e^{-j\omega_1})=0$$

$$G_d(e^{-j\omega_1})A_m(e^{-j\omega_1})+G_m(e^{-j\omega_1})A_d^*(e^{j\omega_1})=0.$$

When this condition holds, the corresponding pre-compensator continues to satisfy the desired equalization conditions.

In the symmetric case, we observed that the pre-compensation and post-compensation conditions were satisfied by the same filters. This would occur for the asymmetric case if the augmentation filters satisfied the conditions for pre-compensation and the conditions for post-compensation. For a specific frequency $\omega_1$ that is only in the signal band, these conditions can be re-written as four equations in four unknowns in terms of the variables $A_d(e^{j\omega_1})$, $A_d^*(e^{-j\omega_1})$, $A_m(e^{j\omega_1})$, and $A_m^*(e^{-j\omega_1})$. In terms of these variables, there are four equations that must be satisfied in order to have the same filters work for both pre-compensation and post-compensation. The resulting equations are $$\begin{bmatrix} G_d(e^{j\omega_1}) & G_m^*(e^{-j\omega_1}) & 0 & 0 \\ 0 & 0 & G_m^*(e^{-j\omega_1}) & G_d(e^{j\omega_1}) \\ G_d(e^{j\omega_1}) & 0 & 0 & G_m(e^{j\omega_1}) \\ G_m^*(e^{-j\omega_1}) & 0 & 0 & G_d^*(e^{-j\omega_1}) \end{bmatrix} \begin{bmatrix} A_d(e^{j\omega_1}) \\ A_m(e^{j\omega_1}) \\ A_d^*(e^{-j\omega_1}) \\ A_m^*(e^{-j\omega_1}) \end{bmatrix} = \begin{bmatrix} 0 \\ 0 \\ 0 \\ 0 \end{bmatrix}.$$

In general, the system of equations will have full rank, so the only solution will have all four variables equal to zero. This requires that the augmentation filters satisfy $a_d[n]=0$ and $a_m[n]=0$. Thus, the only set of filters that satisfy both the pre-compensation and post-compensation conditions are the filters determined for the symmetric case. Hence, indirect learning is possible only when the post-compensation filters are equal to the solution for the symmetric case.

3. Mismatch Channel Estimation for Pre-Compensation

This section considers estimation of the mismatch responses $g_d[n]$ and $g_m[n]$ for the transmitter. The estimation algorithms described require that the feedback receiver is compensated to be mismatch-free. An approach to calibration of the feedback receiver is discussed in [5].

Once the feedback receiver compensation is in place, the transmit mismatch channels can be estimated using data-directed techniques rather than blind methods. The input baseband data sequence x[n] and the feedback receiver output y[n] are both available for channel estimation.

In the mismatch estimation procedure, the delay through the digital mismatch compensation, analog transmitter, and feedback receiver is first estimated. Once the delay is determined, a pair of channel model filters $\hat{g}_d[n]$ and $\hat{g}_m[n]$, modeling the response to the input sequence and its conjugate respectively, are determined to minimize the error between the mismatch channel model output and the feedback receiver output. Based on the channel models, the corresponding pre-compensation filters can be computed.

3.1 Delay Estimation

The system delay is estimated by a correlation-based technique. The cross-correlation between x[n] and y[n] is computed, and the estimated delay is determined by finding the peak magnitude of the output correlation sequence. Here, we define the indexing such that x[n] and y[n] are the baseband output sample and the feedback receiver sample generated on the same clock cycle. This technique can identify the integer delay of the system effectively. The delay estimator is given by $$\hat{d} = \underset{d}{\text{argmax}} \left\| \sum_{n=-L}^{L} x^*[n-d]y[n] \right\|$$

where the total amount of data used in the correlation is 2L+1.

3.2 Least-Squares Channel Estimation

Once the delay is estimated, the channel model filters are determined using a least-squares criterion. The channel model filters used are odd length FIR filters with 2M+1 taps, centered on the estimated system delay. The estimated channel output is given by $$\hat{y}[n] = \sum_{k=-M}^{M} \hat{g}_d[k]x[n-\hat{d}-k] + \sum_{k=-M}^{M} \hat{g}_m[k]x^*[n-\hat{d}-k].$$

The channel model filters are indexed by k from −M to M, with the tap k=0 corresponding to the channel at the estimated system delay. The model filters are adapted to minimize the squared error criterion $$R = \sum_{n=0}^{B1} \|y[n] - \hat{y}[n]\|^2$$

over the block of B consecutive samples. The solution to minimize this error is typically expressed in terms of a data matrix X[n] and a received data vector y[n]. The time index identifies the starting sample of the block of samples used in the channel estimation algorithm. The data matrix is defined so that the element in row a and column b is given by $X_{ab}=x\lfloor n-\hat{d}+M+a-b \rfloor$. This matrix has Toeplitz structure. The entry $X_{1(2M+1)}$ is the oldest input signal sample in the block of data used for channel estimation. The diagonals of the matrix are constant, and the index for the data increases when the row index increases or the column index decreases. The received data vector entries are defined as y=y[n+a−1]. The data matrix and received data vector are defined so that the vector of estimated channel output can be re-written as $$\hat{y}[n] = [X[n] X^*[n]]\hat{g} = V\hat{g}.$$

The elements of the B dimensional estimated channel output vector are defined as $\hat{y}_a = \hat{y}[n+a-1]$. The vector $\hat{g}$ is the vertical concatenation of the impulse response sequences for the channel model filters. Specific entries of this vector are given by $$\hat{g}_c = \begin{cases} \hat{g}_d[c-M-1] & 1 < c \leq 2M+1 \\ \hat{g}_m[c-3M-2] & c > 2M+1 \end{cases}.$$

The offsets of the index argument in this definition are set due to the convention that the channel model filters indices run from −M to M. Finally, the matrix $V=\lfloor X[n]\ X^*[n] \rfloor$ is the horizontal concatenation of the matrix X[n] and its complex conjugate. Given this formulation for the estimated channel output, the error criterion R is minimized by the familiar least-squares solution $$\hat{g} = (V^H V)^{-1} V^H y,$$

where the notation $V^H$ denotes the conjugate transpose of the matrix. The solution to the least squares problem need not be determined by direct matrix inversion. It can be determined by alternative techniques such as the conjugate gradient algorithm [6]. Additionally, it is common to add a regularization parameter to deal with ill-conditioned matrices. The regularization replaces $V^H V$ with $V^H V + \sigma^2 I$.

The frequency responses of the least-squares channel estimates are denoted $\hat{G}_d(e^{j\omega})$ for the signal path, and $\hat{G}_m(e^{j\omega})$ for the image path. The signal path channel response matches $G_d(e^{j\omega})$ on the signal frequency band and is not constrained in other frequency bands. Likewise, the image path channel response matches $G_m(e^{j\omega})$ on the image frequency band and is elsewhere unconstrained. We use two example signals are used to demonstrate this behavior. The first input signal has a slightly asymmetric power spectrum. It is an OFDM signal with signal band support over the frequency band $-(f_s/8) \leq f \leq (f_s/16)$. For this signal, the region $-(f_s/16) \leq f \leq (f_s/16)$ is symmetric, both signal band and image band. The full image band is $-(f_s/16) \leq f \leq (f_s/8)$. The second input signal has a highly asymmetric power spectrum. It is another OFDM signal with signal band support over the frequency band $(6f_s/16) \leq f \leq (7f_s/16)$. There is no symmetry in this signal support band. The image band falls in the frequencies $-(7f_s/16) \leq f \leq (6f_s/16)$.

The comparison between the true channel magnitude response and the estimated channel magnitude response is $\|G_d(e^{j\omega})\|$ for these asymmetric signals, and the error magnitude is $\|G_d(e^{j\omega}) - \hat{G}_d(e^{j\omega})\|$. The estimation accuracy for the conjugate channel magnitude response is $\|G_m(e^{j\omega})\|$. In regions where the signal band and image band overlap, both the signal path channel and conjugate path channel are estimated accurately. In regions without overlap, the channel estimation procedure determines only one transfer function accurately.

3.3 Least-Squares Post-Compensation and Indirect Learning

The least-squares formulation in this section can be adapted to compute a post-compensation filter. Once the delay is estimated, the post-compensation filter estimates the transmitted data from the feedback receiver output. The post-compensation estimate is given by $$\hat{x}[n-\hat{d}] = \sum_{k=-M}^{M} w_d[k]y[n-k] + \sum_{k=-M}^{M} w_m[k]y^*[n-k].$$

The functional form of the post-compensation estimate resembles the channel estimate. The post-compensation filter coefficients can be estimated using a least-squares computation where the data matrix is formed from the samples of the feedback receiver output y[n] and the target data vector is generated from samples of x[n].

Computation of Compensation Filters in Indirect Learning. The Filters are Used for Pre-Compensation after the Least-Squares Computation is Finished The results of the least-squares post-compensation computation for a variety of signal conditions are shown in FIG. 2. The figure shows the conjugate path transfer function magnitude that satisfies the image cancellation conditions in blue, the actual transfer function magnitude $\|W_m(e^{j\omega})\|$ in magenta, and the error magnitude between the two in red. The filter coefficients derived from indirect learning satisfy the post-compensation image cancellation condition on the image frequency bands.

In indirect learning, the estimated post-compensation filters can be applied as pre-compensation filters successfully only on frequencies where the image band and signal band overlap. The transfer functions for the pre-compensation image cancellation conditions are shown in FIG. 2. The blue curves plot the desired transfer function magnitude for image cancellation, the magenta curves show the transfer function magnitude for $\|W_m(e^{j\omega})\|$, and the red curves show the error magnitude. The pre-compensation image cancellation condition is not satisfied for the highly asymmetric example signal spectrum. There is a single frequency with coincidental image cancellation where the two transfer functions intersect. The image cancellation conditions are satisfied over the band $-(f_s/16) \leq f \leq (f_s/16)$ for the input signal with a partially asymmetric input spectrum. This is precisely the band where the image and signal bands overlap.

The examples in FIG. 1 to FIG. 3 indicate that the straightforward least-squares channel estimation or post-compensation cannot be used to design a pre-compensation filter when the signal band is asymmetric. The image cancellation condition for the pre-compensation filters requires knowledge of the signal transfer function $G_d(e^{j\omega})$ on the image frequency band. This transfer function is estimated accurately on the signal band only when channel estimation is performed as in FIG. 2. There is a unique post-compensation transfer function that can be used for pre-compensation, but the estimated post-compensation filter only agrees with this transfer function for symmetric signal bands.

The transfer functions estimated for post-compensation by least-squares can be compared with the ideal transfer functions that are simultaneously effective pre-compensation and post-compensation filters. The least-squares post-compensation filters are computed, and are compared to the transfer functions that can be used for both pre-compensation and post compensation derived in Section 2. The estimated signal path compensation filter $w_d[n]$ agrees well with the ideal filter over the entire signal band for both example signals. The estimated conjugate path filter $w_m[n]$ works agrees with the ideal compensation filter only for frequencies that are in both the signal and image frequency bands. For the slightly asymmetric example signal, the error is small only in the band $-(f_s/16) \leq f \leq (f_s/16)$. For the highly asymmetric example signal, the estimated conjugate path compensation filter does not agree with the ideal compensation filter at most frequencies.

In order to compute an effective pre-compensation filter for an input signal with an asymmetric frequency band, the signal path filter transfer function is required on the image band. The examples thus far have shown that this is not feasible for highly asymmetric signals using a single iteration of either channel estimation or indirect learning. An example of this is shown in FIG. 3.

The post-compensation filter successfully suppresses the undesired image. When used as a pre-compensation filter, however, this filter is not able to suppress the image at all.

For slightly asymmetric channels, indirect learning does not suppress the image to the noise floor, but it does achieve some suppression. As shown in FIGS. 2 and 3, the image is suppressed effectively over the overlap band between signal and image, and the image suppression slowly gets worse in frequencies adjacent to the overlap band. Since the asymmetric part of the image band is adjacent to the overlap band, it is suppressed well over part of its span. This effect is shown in FIG. 3. The image suppression of the asymmetric part of the image is 70 dB near the signal band and decays to 60 dB suppression at the far edge of the band. If the asymmetry was larger, the suppression would continue to decay for frequencies further from the signal band. The decay profile is given by the red curve in FIG. 3.

3.4 Perturbation Based Least-Squares Channel Estimation

The mismatch channel for the transmit analog signal chain can be estimated accurately by modifying the output signal to place energy in the image signal band. The IQ mismatch compensation filter can be set arbitrarily during the channel estimation procedure. When $w_m[n]$ is non-zero, the input to the channel has energy in the input band. The channel estimation algorithm can determine the channel in that band. Consider a case where the signal path pre-compensation filter is set to $w_d[n]=\delta[n]$ and $w_m[n]=p\delta[n]$, where p is a real-valued constant less than one. The least-squares algorithm treats the cascade of the pre-compensation filter and the transmit analog chain as the channel to be estimated. The feedback receiver output is given by $$y[n]=g_d[n]\otimes(x[n]+px^*[n])+g_m[n]\otimes(x[n]+px^*[n])^*$$

$$=(g_d[n]+p^*g_m[n])\otimes x[n]+(g_m[n]+pg_d[n])\otimes x^*[n]^*$$

The cascaded channel is a widely-linear channel where the signal and image filters are mixtures of the equivalent filters for the analog alone. When the channel estimation algorithm is applied to the cascaded channel, it determines the equivalent signal transfer function $F_d(e^{j\omega})=G_d(e^{j\omega})+p^*G_m(e^{j\omega})$ on the signal band and the equivalent image transfer function $F_m(e^{j\omega})=G_m(e^{j\omega})+pG_d(e^{j\omega})$ on the image band. Thus, the estimate of $F_m(e^{j\omega})$ on the image band contains information about the signal path transfer function $G_d(e^{j\omega})$. The equivalent transfer function estimates give two equations in four unknowns—the signal and image transfer functions on both the signal band and the image band. Channel estimation with another value for p provides two more equations. The system can be solved for all of the unknowns.

In the frequency domain, the system of equations is given by $$\begin{bmatrix} 1 & p_1^* & 0 & 0 \\ 0 & 0 & p_1 & 1 \\ 1 & p_2^* & 0 & 0 \\ 0 & 0 & p_2 & 1 \end{bmatrix} \begin{bmatrix} \hat{G}_d(e^{j\omega_o}) \\ \hat{G}_m(e^{j\omega_o}) \\ \hat{G}_d(e^{-j\omega_o}) \\ \hat{G}_m(e^{-j\omega_o}) \end{bmatrix} = \begin{bmatrix} \hat{F}_{d,1}(e^{j\omega_o}) \\ \hat{F}_{m,1}(e^{-j\omega_o}) \\ \hat{F}_{d,2}(e^{j\omega_o}) \\ \hat{F}_{m,2}(e^{-j\omega_o}) \end{bmatrix},$$

where $\omega_o$ is a specific frequency in the signal band, the constants $p_1$ and $p_2$ are the two settings for the conjugate path in the pre-compensation filter, and the right hand side column are the outputs for the two iterations of channel estimation. The desired time-domain impulse responses can be determined from the frequency responses by a filter design technique such as frequency-sampled least-squares design. The desired frequency responses can be determined at a set of equally-spaced frequency intervals, and the impulse responses can be determined via the inverse Fourier transform. This procedure can be applied term-by-term to the entries in the above equation to derive a system of equations for the filters directly in the time domain. These equivalent time-domain equations are $$\begin{bmatrix} 1 & p_1^* & 0 & 0 \\ 0 & 0 & p_1 & 1 \\ 1 & p_2^* & 0 & 0 \\ 0 & 0 & p_2 & 1 \end{bmatrix} \begin{bmatrix} \hat{G}_{d,sig}[n] \\ \hat{G}_{m,sig}[n] \\ \hat{G}_{d,img}[n] \\ \hat{G}_{m,img}[n] \end{bmatrix} = \begin{bmatrix} \hat{F}_{d,1}[n] \\ \hat{F}_{m,1}[n] \\ \hat{F}_{d,2}[n] \\ \hat{F}_{m,2}[n] \end{bmatrix}.$$

The subscripts identify the cases where each impulse response is accurate. For example, impulse response $\hat{g}_{d,sig}[n]$ models the behavior of the signal path channel on the signal band.

An example of the output of the two-pass channel estimation method is shown in FIG. 3. The coefficients used in the two settings of the compensation filter are $p_1=0.1$ and $p_2=0.1$. The input signal spectrum is highly asymmetric, and extends over the frequency band $(3f_s/16) \leq f \leq (7f_s/16)$. The true signal transfer function magnitude is shown in blue. The signal band channel estimates are shown in red, and the image band channel estimates are shown in green. For signal and image band, the channel estimates are produced by 33 tap FIR filters.

Once the channel responses for $G_d$ and $G_m$ on the signal and image bands have been determined, pre-compensation filters can be designed. The frequency responses that satisfy the image cancellation conditions for pre-compensation can be determined from the equations in Section 2.2. The pre-compensation filters can be designed by using these responses as targets in standard FIR filter design algorithms.

The algorithm for iterative channel estimation can be generalized to any choice of the pre-compensation filters. Consider the outputs of the individual compensation filters $w_d$ and $w_m$. Let the signal path output be given by $$p_d[n] = \sum_{k=-L}^{L} w_d[k]x[n-k],$$

and the conjugate path output be given by $$p_m[n] = \sum_{k=-L}^{L} w_m[k]x^*[n-k].$$

The signal $p_d[n]$ has support on the signal frequency band, and the signal $p_m[n]$ has support on the image frequency band. In terms of these signals, the output of the analog transmit chain is $$y[n]=g_d[n]\otimes p_d[n]+g_m[n]\otimes p_m^*[n]+g_d[n]\otimes p_m[n]+g_m[n]\otimes p_d^*[n].$$

As in the case of the direct channel estimation procedure, data matrices for these signals can be defined. The data matrix for the signal band is $P_{d,ab}=p_d\lfloor n-\hat{d}+M+a-b \rfloor$. Additionally, the data matrix for the image band is given by $P_{m,ab}=p_m\lfloor n-\hat{d}+M+a-b \rfloor$. Using this notation, the transmit output can be expressed as $$y=[P_d P_m^* P_m P_d^*]\hat{g}+n=U\hat{g}+n$$

where the vector $\hat{g}$ is the vertical concatenation of the impulse responses $\{\hat{g}_{d,sig}[n], \hat{g}_{m,sig}[n], \hat{g}_{d,img}[n], \hat{g}_{m,img}[n]\}$ and the matrix $U=[P_d P_m^* P_m P_d^*]$ is the concatenation of data matrices for the signal and image bands. These data matrices can be formed from vertical concatenation of data generated by multiple settings of the pre-compensation filters in order to have enough degrees of freedom to model the channel correctly. For example, in the earlier special case presented, a portion of the samples of these data matrices are generated with $w_m[n]=p_1\delta[n]$ and the remainder are generated with $w_m[n]=p_2\delta[n]$. In this formulation, the four channel model filters needed to fully describe the widely linear system for asymmetric signals are given by $$\hat{g}=(U^H U)^{-1}(U^H y).$$

The channel estimation algorithm presented relies upon choosing an arbitrary setting for the pre-compensation filter. This arbitrary choice produces an image in the output signal that is controlled by the magnitude of $p_1$ and $p_2$. If the image produced is too large, this algorithm cannot be used after the compensation has converged in order to track channel changes. It is possible to use the arbitrary pre-compensation filters at system start-up since there is allotted time for the system to calibrate itself. During this time interval, it is expected that out-of-band signal energy is emitted.

In order to determine the suitability of the channel estimation algorithm for tracking, the magnitude of the $p_i$ perturbation coefficients was varied, and the residual image strength was determined.

The magnitude of the perturbation in decibels (dB) is the magnitude of the residual image produced by the perturbation when the system is calibrated correctly. The vertical axis of the plot shows the image rejection ratio in dB when the pre-compensator is designed from the channel estimates using the equations in Section 2.2. The image rejection begins to degrade when the magnitude of the perturbation is larger than −65 dB. In order to achieve the desired level of image rejection, the perturbation would produce an image that violates the image rejection requirements for Marconi during the time when the channel estimates are updated. Thus, the perturbation algorithm can be used during initial training to determine a starting pre-compensation filter, but another technique is needed to update the filter during steady-state data transmission.

4. Direct Learning Adaptation Algorithms

The learning architectures in Section 3 cover two potential locations for the compensation filters in transmit IQ mismatch compensation. The channel estimation algorithms adapt widely linear filters that process data from the digital baseband to reproduce the output of the feedback receiver. The indirect learning algorithms adapt widely linear filters that process the output of the feedback receiver in order to reproduce the baseband data. A third choice is to adapt widely linear filters that operate on the transmitted data so that the input to the compensation filters and the output of the feedback receiver agree. This algorithm directly updates the compensation filter in the signal path, so it is called direct learning.

The complex baseband data sequence $x[n]$ is processed by widely linear compensation described by the complex-valued filters $w_1[n]$ and $w_2[n]$. The output data $(w_1[n]\otimes x[n])+(w_2[n]\otimes x^*[n])$ passes through the transmit analog chain. The mismatches in this circuit are modeled by the widely linear system with complex-valued filters $g_1[n]$ and $g_2[n]$. The transmitted output passes through a feedback receiver that has already been compensated for IQ mismatch. The output sequence of the feedback receiver is denoted $y[n]$. The feedback receiver output, in terms of the compensation filter components, is given by $$y[n] = (g_1 \otimes w_1 + g_2 \otimes w_2^*) \otimes x[n] + (g_1 \otimes w_2 + g_2 \otimes w_1^*) \otimes x^*[n]$$
$$= \begin{cases} (g_1 \otimes x + g_2 \otimes x^*) \otimes w_{1r} + j(g_1 \otimes x - g_2 \otimes x^*) \otimes w_{1i} + \\ (g_2 \otimes x + g_1 \otimes x^*) \otimes w_{2r} + j(g_1 \otimes x^* - g_2 \otimes x) \otimes w_{2i}. \end{cases}$$

An error signal is generated by subtracting delayed versions of $x[n]$ and $y[n]$. The error signal drives the adaptation of the compensation filters.

4.1 Direct Learning State Updates

The adaptation attempts to determine the filter updates that maximize the reduction in the error signal. The filter state is fixed while a block of data is captured. From the captured data and the corresponding baseband input data, the compensation filters are updated in the estimated direction of steepest descent in the error. The state vector for the filter update is $$w[n] = [w_{1r}[0] w_{1i}[0] w_{1r}[1] w_{1i}[1] \ldots w_{2r}[0] w_{2i}[0] \ldots w_{2r}[K-1] w_{2i}[K-1]]^T$$

Here, K denotes the length of the compensation filters. The vector is broken into real and imaginary components since the complex-valued derivatives for the error signal cannot be computed. The feedback receiver output z[n] contains $w_1^*[n]$ and $w_2^*[n]$. Complex-valued derivatives of the complex conjugate function do not exist. The complex-valued error signal is $e[n] = y[n-d_2] - x[n-d_1]$, and the real-valued equivalent error vector is $$e[n] = [\text{Re}(e[n-B+1])\text{Im}(e[n-B+1]) \ldots \text{Re}(e[n])\text{Im}(e[n])]^T.$$

The time index n is the last sample in the data block captured to compute the updated compensation filters. The parameter B is the number of samples in the data block. The general form of the update is given by $$w[n] = w[n-1] - \mu \Delta w[n],$$

where $\Delta w[n]$ is the estimated direction of steepest descent for the error.

The descent direction can be determined by a linear approximation for the error function. Assuming that the filter is near the minimum error point the filter state vector can be written $w[n] = w_o + \Delta w[n]$, where $w_o$ is the optimal setting and $\Delta w[n]$ is a small correction that can be taken as the descent direction. This expression for the filter state can then be substituted into the equations for y[n] and e[n]. Since $w_o$ is optimal, it reproduces x[n] at the feedback receiver output, and the error contribution is due completely to $\Delta w[n]$. The linear dependence between the descent direction and the error is $$e[n] = \begin{cases} (g_1 \otimes x + g_2 \otimes x^*) \otimes \Delta w_{1r} + j(g_1 \otimes x - g_2 \otimes x^*) \otimes \Delta w_{1i} + \\ (g_2 \otimes x + g_1 \otimes x^*) \otimes \Delta w_{2r} + j(g_1 \otimes x^* - g_2 \otimes x) \otimes \Delta w_{2i} \end{cases}.$$

Here, the sequences $\{\Delta w_{1r}, \Delta w_{1i}, \Delta w_{2r}, \Delta w_{2i}\}$ are the elements of $\Delta w$ grouped according to the filter impulse responses rather than the state vector indexing.

These relationships can be used to form a system of equations relating the measured error for each element in e[n] to the descent direction. We denote the relationship by $e = J(\Delta w)$, where the matrix relating the two vectors is called the Jacobian. This matrix collects the first partial derivatives of the feedback path output with respect to the components of w[n]. It can be expressed as $$J = \begin{bmatrix} \frac{\partial y_r[n-B+1]}{\partial w_{1r}[0]} & \frac{\partial y_r[n-B+1]}{\partial w_{1i}[0]} & \frac{\partial y_r[n-B+1]}{\partial w_{1r}[1]} & \frac{\partial y_r[n-B+1]}{\partial w_{1i}[1]} & \cdots \\ \frac{\partial y_i[n-B+1]}{\partial w_{1r}[0]} & \frac{\partial y_i[n-B+1]}{\partial w_{1i}[0]} & \frac{\partial y_i[n-B+1]}{\partial w_{1r}[1]} & \frac{\partial y_i[n-B+1]}{\partial w_{1i}[1]} & \cdots \\ \frac{\partial y_r[n-B+2]}{\partial w_{1r}[0]} & \frac{\partial y_r[n-B+2]}{\partial w_{1i}[0]} & \ddots & & \\ \vdots & \vdots & & & \end{bmatrix}.$$

The matrix has 2B×4K dimensions, and has real-valued entries. Increasing the row index changes the samples of y[n] to which the partial derivative numerator corresponds. Increasing the column index changes which filter coefficient the partial derivative is evaluated with respect to. The first 2K columns correspond to partial derivatives with respect to the real and imaginary parts of $w_1[n]$ and the columns 2K+1 to 4K correspond to partial derivatives with respect to the real and imaginary parts of $w_1[n]$. These partial derivatives depend upon the input sequence and channel impulse response. If models for the impulse response are available, the partial derivatives can be evaluated by filtering the transmit data with appropriate filters. In expressions involving convolutions between a channel estimate and x[n], the channel estimate should be accurate on the signal band. In expressions involving convolutions between a channel estimate and x*[n], the channel estimate should be accurate on the image band. The bands where channel estimates are accurate are denoted by superscripts. The functional form of the partial derivatives in terms of the input data and channel estimates is given by the expressions:

$$\frac{\partial y_r[n]}{\partial w_{1r}[k]} = \text{Re}((\hat{g}_1^{sig} * x + \hat{g}_2^{img} * x^*)[n-k])$$

$$\frac{\partial y_r[n]}{\partial w_{1i}[k]} = -\text{Im}((\hat{g}_1^{sig} * x - \hat{g}_2^{img} * x^*)[n-k])$$

$$\frac{\partial y_i[n]}{\partial w_{1r}[k]} = \text{Im}((\hat{g}_1^{sig} * x + \hat{g}_2^{img} * x^*)[n-k])$$

$$\frac{\partial y_i[n]}{\partial w_{1i}[k]} = \text{Re}((\hat{g}_1^{sig} * x - \hat{g}_2^{img} * x^*)[n-k])$$

$$\frac{\partial y_r[n]}{\partial w_{2r}[k]} = \text{Re}((\hat{g}_1^{img} * x^* + \hat{g}_2^{sig} * x)[n-k])$$

$$\frac{\partial y_r[n]}{\partial w_{2i}[k]} = -\text{Im}((\hat{g}_1^{img} * x^* - \hat{g}_2^{sig} * x)[n-k])$$

$$\frac{\partial y_i[n]}{\partial w_{2r}[k]} = \text{Im}((\hat{g}_1^{img} * x^* + \hat{g}_2^{sig} * x)[n-k])$$

$$\frac{\partial y_i[n]}{\partial w_{2i}[k]} = \text{Re}((\hat{g}_1^{img} * x^* - \hat{g}_2^{sig} * x)[n-k]).$$

The entries in the Jacobian matrix can be determined if channel models are available. There are two approaches to determining the channel models. The first approach uses channel estimation algorithms from Section 5 to determine the models. Since the system may be used with asymmetric signal bands, the perturbation algorithm described in Section 5.4 may be needed to determine channel models valid for signal and image bands. These models can be computed once during system initialization. The temporarily increased image strength due to the perturbations may be acceptable since the system is not expected to operate without out-of-band emissions upon initial activation. The second approach uses an approximate impulse response derived based on the circuit architecture. If the deviations between the true response and the assumed channel models are small enough, the direct learning algorithm can converge. The acceptability of the approximate model must be tested by comparing the algorithm performance with both models.

For direct learning to work correctly, the delays in the system must be matched carefully. First, the delays used in error computation must be matched. In Section 5.1, the algorithm used to estimate the delay between the feedback receiver output and the baseband data input x[n] was described. In direct learning, this total delay estimate includes the latency for filtering with the pre-compensation filter, and is denoted by $d_{chan}$. For the error computation to be correct, the delays applied to the baseband input data ($d_1$) and the delay applied to the feedback receiver output data ($d_2$) must satisfy the constraint $$d_1+d_2=d_{chan}.$$

When the pre-compensation filters work correctly, the feedback receiver output is a delayed version of x[n]. This constraint guarantees that the stored version of x[n] used in error computation with the feedback output is properly synchronized and the error vanishes.

Additionally, the delays used in the Jacobian correction must be synchronized with the delay used in the error computation. The elements of the Jacobian matrix are computed by filtering the baseband signal x[n] with channel model filters that have m coefficients. The channel models are designed so the main tap in the center of the filter impulse response. Thus, the filtering has an approximate delay of $\lfloor M-1 \rfloor/2$ samples. For proper computation of the Jacobian, the channel model output should be synchronized with the main tap of the true channel response that generates the feedback receiver output at delay $d_{chan}$, as shown in FIG. 2.

The un-filtered version of x[n] is delayed by $d_1$ samples, so the filtered version used in the Jacobian should be delayed by $d_j=d_1-\lfloor M-1 \rfloor/2$ samples to account for the delay already generated by the channel model filter. For any set of delays satisfying the constraints, the equation $e=J(\Delta w)$ produces a valid update to the compensation filter. When the delays are estimated incorrectly, the compensation filter wastes degrees of freedom in order to correct the error.

The descent direction for the filter state vector is computed from the properly synchronized error signal and the estimated Jacobian matrix. In Marconi, the data blocks for iterations of the direct learning algorithm can be several thousand samples long, while the compensation filters have up to seven complex-valued coefficients in Marconi's hardware. The Jacobian matrix has thousands of rows and twenty-eight columns. The system of linear equations connecting them $e=J(\Delta w)$ is over-determined. Additionally, the error vector contains the effect of measurement noise that has not been included in the discussion to simplify the equations in this section. Thus, the descent direction must be computed using an approximate solution to the system of equations.

The familiar least-squares solution to the system of equations can be used to determine the descent direction. As in Section 3, the solution is $\Delta w=(J^TJ)^{-1}(J^Te)$. The corresponding update to the state vector is $$w[n+1]=w[n]-\mu(J^TJ)^{-1}(J^Te[n]).$$

The computational cost of the update is dominated by computing the auto-correlation sequences in $J^TJ$ and the cross-correlation sequences in $J^Te$, and the matrix inversion. The full matrix inversion has been difficult to compute accurately in the single-precision floating point data type available in Marconi's ARM ALU. For many of the test cases, the auto-correlation matrix is ill-conditioned. An alternative approach to solving the over-determined system determines the descent direction using the conjugate gradient algorithm [6] to solve the system of equations. Finally, the Kalman filter [7] has been used to determine the filter state vector. The state update equation is $$w[n+1]=w[n]+q[n],$$

where q[n] is zero-mean, Gaussian-distributed state noise. The measurement equation in the Kalman filter is time-varying, and uses the Jacobian estimated from the captured data block to relate the filter state to the output data:

$$y[n]=J[n]w[n]+v[n].$$

The vector v[n] is zero-mean, Gaussian-distributed measurement noise. Additionally, the vector $$y[n]=[y_r[n-B+1]y_i[n-B+1]y_r[n-B+2]y_i[n-B+2] \ldots y_r[n]z_i[n]]^T$$

is a rearrangement of the captured feedback receiver output data to separate the real and imaginary parts as in the filter state vector. The Jacobian matrix J[n] is computed using the channel models as described above, and the time index is added explicitly since it varies from block to block. The standard Kalman filter update equations apply this model is linear, so the update or measurement equations do not require linearization. The step-size $\mu$ can be incorporated by multiplying it with the standard form for the Kalman gain in the state update equation of the filter.

4.2 Simplification of the Direct Learning State Update

The full estimation of the Jacobian is very expensive when the channel model filters used have many coefficients. There are four complex-valued filters, so the Jacobian estimation has twice the computational cost per tap than the pre-compensation filtering. Additionally, the correlations needed to compute the compensation filter update are expensive. We examine four techniques to reduce the computational burden for computing the updated pre-compensator in direct learning.

The first three simplifications rely on the observation that the direct learning algorithm is resistant to estimation error in the Jacobian matrix. The channel models can be simplified by reducing the number of taps in the filter impulse responses $\{\hat{g}_1^{sig}, \hat{g}_1^{img}, \hat{g}_2^{sig}, \hat{g}_2^{img}\}$. In the extreme case, each filter can be represented as a scalar. The initial analog circuit is close to ideal initially, so the approximation $\hat{g}_1^{sig} \approx \hat{g}_1^{img}$ can be used in Jacobian computation. The third simplification relies upon the fact that the initial image signal is more than 30 dB below the desired signal. Thus, the Jacobian computation can ignore the conjugate path filter, i.e. use $\hat{g}_{s2}^{sig}[n]=\hat{g}_{s2}^{img}[n]=0$. These approximations reduce Jacobian computation to scaling delayed versions of the input signal or its complex conjugate. The scale factors can be applied after the correlation operation is done. These aggressive approximations significantly reduce the computational cost for direct learning updates, but they must be justified by their performance in simulation with realistic channel models and or with lab tests with prototype hardware.

A large simplification in the notation for the direct learning update algorithm arises from ignoring the conjugate path filter in the channel model. The output, according to the simplified model, only depends on the signal path filter, and the complex conjugate of the compensation filters does not appear in the approximate expression for the feedback receiver output:

$$y[n] \approx (g_1 \otimes w_1) \otimes x[n]+(g_1 \otimes w_2) \otimes x^*[n].$$

The complex-valued derivative of this expression relative to the pre-compensation filter coefficients exists, so the update algorithm can use complex arithmetic, thereby avoiding the book-keeping overhead of interleaving and de-interleaving the real and imaginary parts of the data.

The scalar channel model further simplifies the new complex-valued version of the Jacobian matrix. Let the data matrix for the current block be given by $$T_x = \begin{bmatrix} x[n-B+1] & \cdots & x[n-B-K+2] \\ \vdots & x[n-B+1] & \ddots \\ x[n] & \ddots & \ddots \end{bmatrix}.$$

This is a Toeplitz matrix generated from the data block. It has dimension B×K, and each entry is complex-valued. In general, the entries of the matrix have the form $[T_x]_{ab} = x[n-B+a-b+1]$. The complex-valued Jacobian can be written $$J_c = [\hat{g}_{1,sig} T_x \hat{g}_{1,img} T_x^*]$$

in terms of this data matrix. The Jacobian can be further simplified with the approximation that the signal and image band channel models are identical. The Jacobian becomes $J_c = \hat{g}_1[T_x\ T_x^*]$. Finally, the dependence on the channel model can be dropped completely using assumptions regarding the analog circuit design and details of the feedback receiver operation. The feedback receiver has degrees of freedom to determine the overall scaling of the output signal. It can be scaled so that the channel magnitude can be set to unity: $\|\hat{g}_1\|=1$. Additionally, there is block-to-block phase variation that is compensated, so the phase can be set to zero. Details of the phase compensation are presented in Section 4.3. After the magnitude and phase are set, the complex-valued Jacobian can be simplified to $J_c = [T_x\ T_x^*]$.

With the new complex Jacobian, the state variables can also be treated as complex rather than real-valued. The filter state is given by $w_c = [w_1[0] \ldots w_1[K-1]\ w_2[0] \ldots w_2[K-1]]^T$, where the entries are the complex-valued filter coefficients for the signal and image paths of the pre-compensator. The updated value for the filter state vector $\Delta w_c$ is complex valued and matches the same indexing. The new error vector definition is $e_c[n] = [e[n-B+1] \ldots e[n]]^T$. The complex-valued update vector can be determined by solving the linear system $J_c(\Delta w_c) = e_c$. The solution methods discussed—least-squares, conjugate gradient, or the Kalman filter, remain options to solve the equation, as long as the variables are treated as complex rather than real-valued. For example, update with the least squares solution becomes $$w_c[n+1] = w_c[n] - \mu (J_c^H J_c)^{-1}(J_c^H e_c[n]),$$

with the superscript notation $J_c^H$ representing the conjugated transpose of the matrix $J_c$.

In order to solve the system of equations for the update to the filter coefficients, the expensive tasks of computing the auto-correlation matrix $J_c^H J_c$ and cross-correlation vector $J_c^H e$ must be addressed. For finite length blocks of data, each entry of these correlations is different. The computations can be facilitated by approximations based on the statistical properties of the baseband input data $x[n]$, and special purpose hardware acceleration in the Marconi digital baseband.

Marconi contains special-purpose hardware for computing correlation from blocks of data stored in memory. The correlation hardware has accumulators available to compute up to 10 consecutive correlation lags in parallel. It also can be re-run with programmable delays between the two data sequences so that correlation lags larger than the delay line length can be computed if needed. The correlation hardware supports computation of an auto-correlation sequence from one block of data stored in memory, or cross-correlation from two distinct stored data sequences. It handles data blocks up to 4K samples. If larger averaging lengths are needed, the correlation accumulators can be stored in software and averaged over multiple data captures and runs of the hardware correlation computation. In addition to computing traditional correlation, the hardware supports computation of a properness metric [8], defined as the cross-correlation between a data sequence z[n] and the complex conjugate sequence x*[n].

The correlation hardware enables the computation of $J_c^H e$. The matrix multiplication can be decomposed into quantities that can be computed with the correlation hardware accelerator. The expression is $$J_c^H e = \begin{bmatrix} T_x^H \\ (T_x^*)^H \end{bmatrix} \begin{bmatrix} (y[n-B+1-d_2] - x[n-B+1-d_1]) \\ \vdots \\ (y[n-d_2] - x[n-d_1]) \end{bmatrix} = \begin{bmatrix} T_x^H \\ (T_x^*)^H \end{bmatrix} y_c[n] - \begin{bmatrix} T_x^H \\ (T_x^*)^H \end{bmatrix} x_c[n].$$

The delays $\{d_1, d_2\}$ were defined in Section 2.1. Additionally, the vectors $y_c[n]$ and $x_c[n]$ are vectors of correctly delayed feedback receiver output data and baseband input data respectively. Since $T_x$ is a Toeplitz matrix of baseband input data samples, the terms in this expression can be computed as auto-correlation of $x[n]$, the properness metric for $x[n]$, the cross-correlation between $x[n]$ and $z[n]$, or the related properness metric.

The computation of the matrix $J_c^H J_c$ can be simplified using the statistical properties of the baseband input data. The data is generated by a communication signal. Such signals are proper [8], so the properness metric satisfies $E[(x_c^*)^H x_c] = 0$, where $E[\ldots]$ is the expectation operator and 0 is the zero vector. Additionally, the signal is wide-sense stationary, so auto-correlation of the data depends only on the relative lag between the two data blocks rather than both starting points. Instead of computing every element of $J_c^H J_c$, the most entries will be approximated so that they final matrix can be computed with a small number of runs for the correlation hardware accelerator. Since the input signal is proper, the off-diagonal blocks of the matrix can be set to zero, i.e. $T_x^H T_x^* \approx 0$ and $(T^*)_x^H T_x \approx 0$. Due to the wide-sense stationarity of the signal, the matrix $T_x^H T_x$ can be approximated as a Toeplitz matrix formed from the vector $T_x^H x_c[n]$. The data also can be used to approximate $(T_x^*)^H T_x^*$. No additional computation is needed to $J_c^H J_c$ since the auto-correlation vector computation is part of the approximation for $J_c^H e$.

4.3 Compensating Direct Learning for System Impairments

The direct learning algorithm must coexist with the other calibration algorithms for the transmitter, and must be robust when the feedback receiver is shared between multiple transmit chains. In Marconi, the feedback receiver is shared between several calibration algorithms. It is used to capture data for transmit IQ mismatch compensation of both transmit chains, and for the digital pre-distortion (DPD) of the power amplifier (PA). The DPD is computed off-chip in another digital baseband chip, such as GC5330. Sharing between the transmitters and the DPD means that the data captures for direct learning updates are not consecutive the interval between updates many more samples than the captured data blocks.

Additionally, the feedback receiver PLL alternates between carrier frequencies when it is used to calibrate multiple transmit chains. If the receiver was used to capture data for channel 2 between two data captures for channel 1, the initial phase between the two channel 1 data blocks will not be identical. There is a block-to-block random phase variation induced by the alternation of the receiver carrier frequency.

Marconi is used in a system that contains an external PA and an external digital baseband that may contain DPD to pre-compensate for the PA distortion. The DPD output has an expanded bandwidth due to third-order and fifth-order distortion components. The mismatch compensation should compensate mismatch for the distortion as well as the desired signal, since the DPD adaptation algorithm may be designed under the assumption of a transmit path free of mismatch effects. In addition, the mismatch compensation algorithm should be able to adapt correctly in the presence of the distortion generated by DPD and the resulting feedback signal that includes the PA non-linearity.

Finally, the direct conversion transmitter and receiver in Marconi have DC offset due to the self-mixing of the carrier frequency in the mixer. The transmit mismatch compensation must be able to adapt in the presence of the residual DC offsets in the system.

This section reviews each of the system impairments for the direct learning algorithm and the modifications to the algorithm to compensate for them.

4.3.1 Update Duty Cycle

The feedback receiver is shared among the transmit IQ mismatch compensation and the DPD for the transmit chains. The data captures for the adaptation of a specific transmit chain compensator are separated by intervals where the feedback receiver is used for one of the other adaptation algorithms. The low duty cycle does not affect the update of the filters due to the wide-sense stationary statistical property of the input signal. It does reduce the tracking ability of the mismatch calibration algorithm. If the mismatch changes due to temperature drift, the updates to the filter must change fast enough to prevent the image signal from violating the performance specifications in Section 2. The Matlab simulation does not have an accurate model for the temperature drift of the mismatch. The update rates of the compensator needed to handle real temperature drifts require Marconi prototype hardware for testing.

4.3.2 Random Phase Variation

The feedback receiver captures data for the IQ mismatch compensation and the DPD adaptation of both transmit channels. Since it serves both channels, the carrier frequency provided to the receiver alternates, and the phase difference between the transmit and receiver mixers changes each time the feedback receiver returns to the same carrier frequency. The phase difference generated can be modeled as a uniformly distributed random variable ranging from 0 to $2\pi$. When the mismatch compensation algorithm was simulated with this impairment, an independent, identically-distributed random phase was applied to every data block. The phase error was estimated and corrected in the correlation computation for the direct learning algorithm. The use of independent phase differences for each data block is a worst-case scenario. When several updates to the mismatch compensation filter are performed before the feedback receiver changes carrier frequency, the phases of the blocks are identical. The phase estimates for the blocks can be averaged together to improve accuracy.

The model for the feedback receiver output can be modified to account for the varying phase difference between the transmitter and receiver mixers. The updated output data is $$y[n]e^{j\phi}[(g_1 \otimes w_1 + g_2 \otimes w_2^*) \otimes x[n] + (g_1 \otimes w_2 + g_2 \otimes w_1^*) \otimes x^*[n]],$$

where the phase variable $\phi$ is uniformly distributed and independent samples are generated for each block of captured data. If multiple blocks of data are captured and averaged before the compensation filters are updated, the feedback receiver must stay fixed on the same carrier frequency during the capture the entire time.

The value of the phase difference can be estimated for a specific data block. Let the vectors $x_c$ and $y_c$ be the baseband input data and feedback receiver output after they delay has been compensated. The phase estimation procedure relies on approximating the channel as complex phase alone. In this case, the output satisfies $$y_c \approx e^{j\phi} x_c + v_c,$$

where $v_c$ is a zero-mean random vector with a Gaussian probability distribution. In this simplified model, the log-likelihood function is $$L = \|y_c - e^{j\phi} x_c\|^2.$$

In this simplified model, the maximum likelihood estimate of the phase difference for the current captured data is $$\hat{\phi} = \text{angle}(x_c^H y_c) = \text{angle}\left(\sum_{k=0}^{B-1} x^*[k-d_1]y[k-d_2]\right).$$

The variables $d_1$ and $d_2$ are the delays described in Section 4.1. The cross-correlation between the baseband data and the feedback receiver output data for the block uses the same delay alignment as the error computation for direct learning.

The phase estimate can be compensated for in the computation of the correlation matrices used for the direct learning update. The least-squares and conjugate gradient algorithms are used to solve the system of linear equations $$(J^H J)(\Delta w) = J^H e.$$

We describe the update here with the some of the simplifications made to direct learning—we approximate the channel model as scalars satisfying $g_1^{sig} \approx g_1^{img} \approx g_1$ and $g_2^{sig} \approx g_2^{img} \approx 0$. Due to the receiver scale factor freedom, the channel magnitude can be approximated as $\|g_1\|=1$. The random phase variation in the system prevents the channel phase from being fixed prior to the compensation. Even if there is a small, constant phase, the random variation produces large phase uncertainties from block-to-block. The auto-correlation matrix for this model is $$J^H J \approx \begin{bmatrix} |\hat{g}_1^{sig}|^2 T_{(x_c^H x_c)} & 0 \\ 0 & |\hat{g}_1^{img}|^2 T_{(x_c^* H x_c^*)} \end{bmatrix} \approx \begin{bmatrix} T_{(x_c^H x_c)} & 0 \\ 0 & T_{(x_c^* H x_c^*)} \end{bmatrix}.$$

The matrices $T_{(x_c^H x_c)}$ and $T_{(x_c^* H x_c^*)}$ are the Toeplitz matrices generated from the auto-correlation sequences of the baseband input and its complex conjugate that are computed by the hardware accelerator. The cross-correlation vector entries in terms of the channel model and the captured data are $$J^H e \begin{bmatrix} (\hat{g}_1^{sig})^*(T_x^H y_c - T_x^H x_c) \\ (\hat{g}_1^{img})^*((T_x^*)^H y_c - (T_x^*)^H x_c) \end{bmatrix} \approx \begin{bmatrix} (g_1)^*(T_x^H y_c - T_x^H x_c) \\ (g_1)^*((T_x^*)^H y_c - (T_x^*)^H x_c) \end{bmatrix}.$$

In this vector, we approximate the phase of the physical channel to be $\arg(g_1) \approx 0$, so the channel dependent terms can be approximated as $g_1^* \approx 1$. The random phase variation in the cross-correlation between $x_c$ and $y_c$ must be compensated because it is subtracted with from the auto-correlation of $x_c$. It is most efficient to compensate the phase variation after the cross-correlations have been computed. The update algorithm should use the phase-compensated cross-correlations $$(T_x^H)e^{-j\hat{\phi}}((T_x^*)^H y)e^{-j\hat{\phi}}$$

in order to correctly update the pre-compensation filters. The final error cross-correlation is given by $$J^H e = \begin{bmatrix} ((T_x^H y_c)e^{-j\hat{\phi}} - T_x^H x_c) \\ (((T_x^*)^H y_c)e^{-j\hat{\phi}} - (T_x^*)^H x_c) \end{bmatrix}.$$

The firmware for the phase computation needs to determine the angle from the cross-correlation output between the stored data vectors, and needs to compute the resulting phase correction. Two possible approaches for these computations are the use of lookup tables, or the use of the CORDIC algorithm for fixed-point coordinate rotations.

The approximations required to treat the filters needed for the Jacobian computation as unit-gain scalars was tested by running the direct learning algorithm using a controllable phase error applied to the image band. The direct learning algorithm was run with scalar filters for Jacobian computation. The simulation used the channel models $\hat{g}_1^{sig}=1$, $\hat{g}_1^{img}=e^{j\Phi}$, $\hat{g}_2^{sig}=0$, $\hat{g}_2^{img}=0$. The phase for $\hat{g}_1^{sig}$ was a free parameter in the simulation. It was varied from −50 degrees to 50 degrees, with spacing of 10 degrees. For every setting of the image band channel model phase, the direct learning algorithm was run, and the steady-state image rejection was determined.

The experiment was run for three different input signal spectra—two 20 MHz LTE carriers centered at 10 MHz and −30 MHz, four 5 MHz LTE carriers, and one 20 MHz carrier centered at 40 MHz. The same mismatch channel model was used for each input signal. The optimal phase for the scalar $\hat{g}_1^{img}$ depended on the input signal spectrum. It was computed by using the perturbation channel estimation algorithm to determine a scalar channel model for the system.

The image band channel model phases for the three input signals are marked by the arrows in the figure. The color code shows the steady-state image rejection achieved by the direct learning algorithm. The 2×20 MHz LTE signal results are shown in blue, the 1×20 MHz LTE results are shown in red, and the 4×5 MHz LTE results are in green. For the cases tested, the direct learning adaptation algorithm converged to acceptable levels of image rejection when the magnitude of the phase error between the true phase for the image band scalar channel model and the value of the phase used in the Jacobian was less than 50 degrees. We expect the phase error to be smaller for realistic physical channels, so the approximations to simplify the channel models used for direct learning described in Section 4.1 and Section 4.3.2 are likely to be valid.

As a final note, we consider one possible refinement to the block phase estimation algorithm. The original approximation for the purposes of estimating the phase used the input data to the pre-compensation filter. This approximation is convenient from a computational perspective, since the cross-correlation needed to determine the block phase estimate is already computed by the hardware accelerator for the pre-compensation filter state update. This approximation treats the pre-compensation filter as an all-pass filter. If the pre-compensation filter output is available, the phase can be estimated using it in place of the data vector $x_c$. The refined phase estimate would be the angle of the inner product between the correctly-delayed pre-compensation output data vector and the feedback receiver output data vector.

The robustness of the simplified direct learning algorithm to the unknown random phase can be analyzed using a simplified model for the system. The general channel can be modeled by four scalars: $\{g_1^{sig}, g_1^{img}, g_2^{sig}, g_2^{img}\}$. The channel output when processing a signal containing $x[n]$ is proportional to $g_1^{sig}$ or $g_2^{sig}$. Correspondingly, the channel output when processing a signal containing $x^*[n]$ is proportional to $g_1^{img}$ or $g_2^{img}$. This model describes the system output well in the limit of small signal bandwidth. In terms of the scalar channel model parameters and the incremental pre-compensation filter updates, the error between the baseband signal and the feedback receiver output is $$e = g_1^{sig}T_x\Delta w_1 + g_1^{img}T_x^*\Delta w_2 + g_2^{sig}T_x\Delta w_2 + g_2^{img}T_x^*\Delta w_1^*.$$

For the purpose of this analysis, we have ignored the random block-to-block phase variation or additive noise and have focused on the error between the true values for the channel parameters and our model that sets $g_1^{sig} \approx g_1^{img} \approx 1$ and $g_2^{sig} \approx g_2^{img} \approx 0$.

The update to the filter coefficients is computed using the model Jacobian matrix $J_c = [T_x \; T_x^*]$. The equivalent cross-correlation matrix is $$J_c^H J \approx \begin{bmatrix} T_x^H T_x & 0 \\ 0 & T_x^{*H} T_x^* \end{bmatrix}.$$

We ignore the Toeplitz approximation to this matrix for the purposes of this analysis. We can use the properness property of the baseband input signal, $T_x^{*H}T_x \approx 0$, to approximate the cross-correlation vector. The simplified form of this vector is $$J_c^H e \approx \begin{bmatrix} g_1^{sig}T_x^H T_x\Delta w_1 + g_2^{sig}T_x^H T_x\Delta w_2^* \\ g_1^{img}T_x^{*H} T_x^*\Delta w_2 + g_2^{img}T_x^{*H} T_x^*\Delta w_1^* \end{bmatrix}.$$

Using these approximations, the direct learning update to the filter state is $$\Delta \hat{w}(J_c^H J_c)^{-1}(J_c^H e) \approx \begin{bmatrix} g_1^{sig}\Delta w_1 + g_2^{sig}\Delta w_2^* \\ g_1^{img}\Delta w_2 + g_2^{img}\Delta w_1^* \end{bmatrix}.$$

In this equation, the variable $\Delta \hat{w}$ is the update to the pre-compensation filter state. The variables $\Delta w_1$ and $\Delta w_1$ are the deviation of the pre-compensation filters from their optimal value, $\hat{w}[n] = w_{opt} + \Delta w[n]$. The variables are distinguished by the "hat" symbol. Using the update equation $\hat{w}[n+1]=\hat{w}[n]-\Delta\hat{w}[n]$ and the definition of the increment, we find $$\hat{w}[n+1] = \hat{w}[n] - \Delta\hat{w}[n]$$

$$= w_{opt} + \Delta w[n] - \Delta\hat{w}[n]$$

$$= \begin{bmatrix} w_{1,opt} + \Delta w_1[n] - (g_1^{sig}\Delta w_1[n] + g_2^{sig}\Delta w_2^*[n]) \\ w_{2,opt} + \Delta w_2[n] - (g_1^{img}\Delta w_2[n] + g_2^{img}\Delta w_1^*[n]) \end{bmatrix}$$

$$= w_{opt} + \begin{bmatrix} (1 - g_1^{sig})\Delta w_1[n] - g_2^{sig}\Delta w_2^*[n] \\ (1 - g_1^{img})\Delta w_2[n] - g_2^{img}\Delta w_1^*[n] \end{bmatrix}.$$

The equation shows that the error between the pre-compensation filter state and the optimal filter settings obeys the recursion $$\Delta w[n+1] = \begin{bmatrix} \Delta w_1[n+1] \\ \Delta w_2[n+1] \end{bmatrix} = \begin{bmatrix} (1 - g_1^{sig})\Delta w_1[n] - g_2^{sig}\Delta w_2^*[n] \\ (1 - g_1^{img})\Delta w_2[n] - g_2^{img}\Delta w_1^*[n] \end{bmatrix}.$$

Since $\|g_1\| \gg \|g_2\|$ for signal and image bands, the magnitude of the error between the pre-compensation filter states and the optimal value converges to zero when the channel coefficients satisfy $\|1-g_1^{sig}\|<1$ and $\|1-g_1^{img}\|<1$. The error forms a decaying exponential sequence when these inequalities hold.

In the complex plane for the channel coefficients, these inequalities define circles centered on the point g=1 with unit radius. In addition, due to the design of the system, the signal path satisfies $\|g_1^{sig}\| \approx \|g_1^{img}\| \approx 1$. This set is the unit circle centered on the origin in the complex plane. A phase error in the channel model moves the true channel model coefficient, represented by the point g=1 along the unit circle $\|g\|=1$, sweeping out an arc defined by the phase error. As long as the point with added phase error falls within the circle $\|1-g\|<1$, the direct learning algorithm converges. The intersection points between the circles fall at $\frac{1}{2}\pm\sqrt{3}/2$, which correspond to a phase error magnitude of 60 degrees. At this phase error, the error no longer decays to zero. This theoretical result is consistent with the simulation results in FIG. 3. The steady-state performance is independent of the phase error as for simulated points within 50 degrees of the true phase. Additionally, the steady-state performance was not dependent on the magnitude of the phase error. It decayed to the point where it was limited by noise. Since the noise was additive to the error, and the Jacobian is independent of the channel model parameters, the noise floor in direct learning is also independent of the channel modeling errors. For phase error magnitude 60 degrees or greater, the error did not converge and performance was poor, as predicted by the model.

4.3.4 Adaptation with Residual DC Offset

The final impairment that the direct learning algorithm must tolerate is residual DC offset. The transmitter DC offset is not cancelled perfectly, so the spur generated from the remaining offset is present in the feedback receiver output signal. The direct learning state can be augmented to include the residual offset, and the system of equations for the compensation output can account for the offset using quantities that are easily computed from the hardware accelerator.

Let the contribution of residual DC offset to the output signal be given by r. The feedback receiver output in the presence of the residual offset is given by $$y[n]=e^{j\phi}[(g_1\otimes w_1+g_2\otimes w_2^*)\otimes x[n]+(g_1\otimes w_2+g_2\otimes w_1^*)\otimes x^*[n]+r]+v[n].$$

In this equation, the residual offset does not have a sample time index because it changes very slowly compared to the rest of the output signal. It is effectively constant over blocks of several thousand samples that are used to updated the pre-compensation filters. Additionally, the DC offset is assumed to be dominated by the transmitter, so it is affected by the random block-to-block phase variations.

Using the approximations from Section 4.2, the feedback receiver output can be approximated in a model that can still produce accurate estimates for the phase and DC offset impairments. The channel model filters can be approximated by a scalar, and the conjugate path filter can be approximate by $g_2 \approx 0$. The simplified output model is given by $$y_c[n]=e^{j\phi}[g(T_x w_1+T_x^* w_2)+r1]+v_c[n].$$

Here, the matrix $T_x$ is the Toeplitz data matrix, the vectors $\{w_1, w_2\}$ represent the pre-compensation filter state, the vector 1 has all entries equal to one, and $v_c$ is Gaussian measurement noise. The parameters to be estimated are the real-valued, scalar channel model g, the residual DC offset r, and the random block phase error $\phi$. A further simplification treats the pre-compensation filter as an all-pass, yielding $(T_x w_1+T_x^* w_2) \approx x_c$ for the pre-compensation filter output. Thus, the simplest model for estimating the impairments is $$y_c=e^{j\phi}[gx_c+r1]+v_c[n].$$

We use a two-stage approach for estimation of the impairments. The first stage estimates the random block phase error from previous estimates of the channel gain and residual DC offset. The block phase error is independently generated from a uniform distribution for every block. In the worst-case there is no information about the current phase error from the past estimate. In the second stage, we compensate the data for the block phase estimate and update the gain and residual DC offset estimates.

For the first stage, we introduce a change of variables: $a=ge^{j\phi}$ and $b=re^{j\phi}$ to produce a simplified linear estimation problem. The system model in terms of the new variables is $y_c=ax_c+b1+v_c$. The estimator for the new parameters is given by $$q = \begin{bmatrix} \hat{a} \\ \hat{b} \end{bmatrix} = \begin{bmatrix} x_c^H x_c & x_c^H 1 \\ 1^H x_c & 1^H 1 \end{bmatrix}^{-1} \begin{bmatrix} x_c^H y_c \\ 1^H y_c \end{bmatrix}.$$

Given these estimates, the model for the phase error is $q=e^{j\phi}[g\ r]^T+w$, where w is an error vector. This model for phase error has a similar format to the phase error model in Section 4.3.2, with the identification of $[g\ r]^T \leftrightarrow x_c$ and $q \leftrightarrow y_c$. Given prior estimators for the channel gain and residual DC offset, the functional form of the block phase error is the same. The corresponding estimator for the block phase error is $$\hat{\phi}=\arg(\hat{g}^*\hat{a}+\hat{r}^*\hat{b}).$$

The key step is to determine the estimates for the channel gain and the residual DC offset given an estimate of the residual phase error. There are several approaches to estimation of these quantities. The most complicated approach adds the channel gain and residual offset to the state adapted by the direct learning algorithm. After compensation for the block phase error, the full direct learning algorithm adapts these parameters jointly with the coefficients for the pre-compensation filters. The simplest approach uses the approximate model for phase estimation to update the channel gain and residual DC offset separately from the pre-compensation filters. An intermediate approach adapts the residual DC offset jointly with the pre-compensation filters and uses the approximate model to update the channel gain estimate. This intermediate model is used because the direct learning update was not highly sensitive to the value of the channel gain. It could be replaced by one without affecting convergence significantly.

In the full complexity model, the state is augmented with entries for the channel gain and the residual DC offset. The new state variable format is $$w_c'=[w_1[0] \ldots w_1[K-1]w_2[0] \ldots w_2[K-1]gr]^T.$$

As in Section 4.2, let the state be represented as $w_o'+\Delta w$, the deviation from the optimal values of the state variables. The direct learning algorithm computes the increment $\Delta w$. The received data in terms of these variables is given by $$y_c'=e^{-j\hat{\phi}}y_c \approx (g_o+\Delta g)(T_x(w_{1,o}+\Delta w_1)+T_x^*(w_{2,o}+\Delta w_2))+(\hat{r}+\Delta r)1.$$

When the terms are re-arranged, and the assumptions that $w_o'$ is optimal is applied, the output is given by $$y_c' \approx x_c(g_o)(T_x(\Delta w_1)+T_x^*(\Delta w_2))+(\Delta g)(T_x(w_1)+T_x^*(w_2))+(\hat{r}+\Delta r)1.$$

The update error vector is given by $$e=\hat{y}_c'-x_c-\hat{r}1 \approx [\hat{g}T_x\hat{g}T_x^*(T_x(\hat{w}_1)+T_x^*(\hat{w}_2))1]\Delta w.$$

The state update $\Delta W$ is a function of the system of equations $e=J_c'(\Delta w)$, where the updated definition of the Jacobian is $$J_c'=[\hat{g}T_x\hat{g}T_x^*(T_x(\hat{w}_1)+T_x^*(\hat{w}_2^*))1].$$

Unlike the algorithm simplification defined in Section 4.2, the Jacobian now depends on the previous parameter estimates. Additionally, the update for the channel gain state depends on the pre-compensation filter output. The channel gain is constrained to be real. At the end of the update computation, the final update is simplified by truncating the imaginary part of the corresponding entry in $\Delta w$.

In the simplified model for updating the channel gain and residual offset estimates, these variables are not added to the direct learning state, and are updated separately. This reduces the size of the state vector and prevents the condition number of the Jacobian matrix from growing. The estimates for the parameters are updated according to the equations $$\hat{g}[n+1]=\hat{g}[n]+\mu_g \text{Re}(e^{-j\hat{\phi}}\hat{a}-\hat{g}[n])$$

$$\hat{r}[n+1]=\hat{r}[n]+\mu_r(e^{-j\hat{\phi}}\hat{b}-\hat{r}[n]).$$

The parameters $\mu_g$ and $\mu_r$ are free step size parameters. For the update of the channel gain, the new estimate is updated using only the real part of the error since it is constrained to be a real-valued gain.

Once the gain and residual DC offset estimates are updated, the residual DC offset estimate is subtracted from the feedback receiver output. The updated error vector is given by $$e=e^{-j\hat{\phi}}y_c-x_c-\hat{r}1.$$

The Jacobian computation is not changed from the simplified direct learning formulation in Section 4.2. The compensation for the residual DC offset in the error changes the form for $J^H e$. The new vector is $$J^H e = \begin{bmatrix} ((T_x^H y_c)e^{-j\hat{\phi}} - T_x^H x_c - \hat{r}T_x^H 1) \\ (((T_x^*)^H y_c)e^{-j\hat{\phi}} - (T_x^*)^H x_c - \hat{r}(T_x^*)^H 1) \end{bmatrix}.$$

The additional terms for this vector can be determined by using the hardware accelerator to compute the block average of $x_c$, or its complex conjugate.

The intermediate complexity update uses the simplified equation $\hat{g}[n+1]=\hat{g}[n]+\mu_g \text{Re}(e^{-j\hat{\phi}}\hat{a}-\hat{g}[n])$ for the channel gain update. The residual DC offset, however, is included in the direct learning state vector. The updated state vector is $$w_c'=[w_1[0] \ldots w_1[K-1]w_2[0] \ldots w_2[K-1]r]^T.$$

Again, the updated error vector is $e=e^{-j\hat{\phi}}y_c-x_c-\hat{r}1$. The error is related to the state update by a Jacobian matrix as in Section 4.2 ($J_c'(\Delta w_c')=e$). The new form for the Jacobian is $$J_c'=[T_x T_x^* 1].$$

The updated auto-correlation matrix and cross-correlation vector include entries that generate the block-averages for the baseband input vector $x_c$ and the feedback receiver output vector $y_c$, which can be computed with the hardware accelerator.

The invention claimed is:

1. A wireless transmitter (TX) circuit based on a direct conversion architecture for use in a system including an external feedback receiver circuit (FBRX), the TX circuit comprising:
   a TX (transmit) signal chain coupled to receive digital TX baseband data x(n), and including
      a digital TX IQ_mismatch pre-compensator to compensate for in-phase (I) and quadrature (Q) mismatch, the TX IQ_mismatch pre-compensator coupled to receive the digital TX baseband data x(n) and provide digital pre-compensated TX baseband data y(n) by performing IQ pre-compensation filtering based on IQ pre-comp filters w1 and w2;
      an analog TX RF (radio frequency) unit to generate an upconverted TX RF signal based on the pre-compensated TX baseband data y(n); and
   an adaptation module coupled to the TX IQ_mismatch pre-compensator to perform direct learning adaptation of the IQ pre-comp filters w1 and w2, modeled respectively as an x(n)_direct transfer function w1 receiving x(n) as input, and a complex conjugate x(n)_image transfer function w2 receiving a complex conjugate of x(n) as input,
      the adaptation module coupled to receive the TX baseband data x(n), and to receive from the external FBRX corresponding FBRX baseband data z(n) based on downconverting the TX RF signal;
      the adaptation module including:
         a TX delay estimator configured to modify x(n) corresponding to a delay through the TX RF unit, producing a delay x(n) signal;
         a FBRX delay estimator configured to modify z(n) corresponding to a delay through the external FBRX unit, producing a delay z(n) signal;
         a TX/FBRX error signal generator configured to generate an adaptation error signal corresponding to a difference between the delay x(n) and delay z(n) signals; and
         a DL (direct learning) adapter configured to perform direct learning adaptation to adjust the IQ pre-comp filters w1 and w2 to minimize the adaptation error signal.

2. The circuit of claim 1, wherein the DL adapter is configured perform a direct learning adaptation that converges in the direction of an estimated steepest descent, according to, where w[n] is the filter state vector for the filter update, and Δw[n] is a steepest descent vector for the estimated direction of the steepest descent, which is related to an error vector (e[n]) for the adaptation error signal by a Jacobian matrix, denoted e=J(Δw).

3. The circuit of claim 2, wherein an update to the filter state vector is w[n+1]=w[n]−μ($J^H J$)$^{-1}$($J_H$e[n]), where [Δw[n]=($J^H J$)$^{-1}$($J^H$e[n])] is based on a least-squares solution for the estimated direction of steepest descent.

4. The circuit of claim 1, wherein an IQ mismatch in the TX RF unit, which receives as input TX baseband data y(n), is modeled by a y(n)_direct transfer function $g_1(f)$ receiving y(n) as input, and a complex conjugate y(n)_image transfer function $g_2(f)$ receiving a complex conjugate of y(n) as input such that direct learning adaption is based on: (a) $\|g_1(f)\|\approx 1$, (b) $\|g_2(f)\|$ is in the range of 30 dB less than $\|g_1(f)\|$, and (c) $\|1-g_1(f)\|<1$.

5. The circuit of claim 4, wherein the external FBRX is based on a direct conversion architecture, including performing analog IQ downconversion and demodulation to provide the FBRX baseband data z(n) without introducing significant IQ mismatch associated with downconversion and IQ demodulation.

6. The circuit of claim 1, wherein the TX IQ_mismatch pre-compensator is further configured to estimate a phase error between the analog TX RF unit upconversion and the external FBRX unit downconversion, and compensate for that phase error according to the phase of a complex number generated in the DL adapter by a cross-correlation between the TX baseband data x(n) and the FBRX baseband data z(n).

7. The circuit of claim 1, wherein the TX IQ_mismatch pre-compensator performs direct learning adaptation to update the IQ pre-comp filters w1 and w2 based on a linear combination of direct learning adaptations for successive data blocks, where the state of the IQ pre-comp filters w1 and w2 is fixed during data block capture.

8. The circuit of claim 1, wherein the TX IQ_mismatch pre-compensator is widely linear, and one of a digital signal processor and a hardware accelerator that perform the following functions: TX delay estimation, FBRX delay estimation, TX/FBRX error signal generation, and DL adaptation.

9. The circuit of claim 1, the TX RF unit having an IQ mismatch associated with IQ modulation and upconversion, manifested as an IQ_mismatch image, and the TX IQ_mismatch pre-compensator performing IQ_mismatch pre-compensation filtering such that the pre-compensated TX baseband data y(n) manifests a compensation image to interfere destructively with the IQ_mismatch image associated with the analog TX RF unit.

10. A method for IQ mismatch pre-compensation for use in a system including a wireless transmitter (TX) based on a direct conversion architecture and a feedback receiver (FBRX), the TX including a TX (transmit) signal chain to receive digital TX baseband data x(n), and generate an upconverted TX RF signal based on IQ mismatch pre-compensated TX baseband data y(n), and further including digital TX IQ_mismatch pre-compensation to compensate for in-phase (I) and quadrature (Q) mismatch, to provide digital pre-compensated TX baseband data y(n) by performing IQ pre-compensation filtering based on IQ pre-comp filters w1 and w2, the method comprising:
    receiving the TX baseband data x(n) and corresponding FBRX baseband data z(n) based on downconverting the TX RF signal;
    performing direct learning adaptation of the IQ pre-comp filters w1 and w2, modeled respectively as an x(n)_direct transfer function w1 receiving x(n) as input, and a complex conjugate x(n)_image transfer function w2 receiving a complex conjugate of x(n) as input, including:
        modifying x(n) corresponding to a delay in generating the TX RF signal, producing a delay x(n) signal;
        modifying z(n) corresponding to a delay through the FBRX, producing a delay z(n) signal;
        generating an adaptation error signal corresponding to a difference between the delay x(n) and delay z(n) signals; and
        performing a direct learning (DL) adaptation to adjust the IQ pre-comp filters w1 and w2 to minimize the adaptation error signal.

11. The method of claim 1, the TX RF unit having an IQ mismatch associated with IQ modulation and upconversion, manifested as an IQ_mismatch image, and the TX IQ_mismatch pre-compensator performing IQ_mismatch pre-compensation filtering such that the pre-compensated TX baseband data y(n) manifests a compensation image to interfere destructively with the IQ_mismatch image associated with TX RF signal upconversion.

\* \* \* \* \*